US012009915B2

(12) United States Patent
Parsche et al.

(10) Patent No.: US 12,009,915 B2
(45) Date of Patent: Jun. 11, 2024

(54) COMPACT RECEIVER SYSTEM WITH ANTIJAM AND ANTISPOOF CAPABILITY

(71) Applicant: Eagle Technology, LLC, Melbourne, FL (US)

(72) Inventors: Francis E. Parsche, Palm Bay, FL (US); Kenneth J. Hendrickson, Melbourne, FL (US)

(73) Assignee: Eagle Technology, LLC, Melbourne, FL (US)

( * ) Notice: Subject to any disclaimer, the term of this patent is extended or adjusted under 35 U.S.C. 154(b) by 390 days.

(21) Appl. No.: 17/590,903

(22) Filed: Feb. 2, 2022

(65) Prior Publication Data

US 2022/0247510 A1 Aug. 4, 2022

Related U.S. Application Data

(63) Continuation-in-part of application No. 17/162,256, filed on Jan. 29, 2021, now Pat. No. 11,502,414.

(51) Int. Cl.
*H04K 3/00* (2006.01)

(52) U.S. Cl.
CPC .................................... *H04K 3/22* (2013.01)

(58) Field of Classification Search
CPC ...... H04K 2203/32; H04K 3/22; H04K 3/228; H04K 3/65; H04K 3/90
See application file for complete search history.

(56) References Cited

U.S. PATENT DOCUMENTS

| | | | |
|---|---|---|---|
| 1,892,221 | A | 12/1932 | Runge |
| 2,973,514 | A | 2/1961 | Sprague |
| 4,150,505 | A | 4/1979 | Voelker |
| 4,623,893 | A | 11/1986 | Sabban |

(Continued)

FOREIGN PATENT DOCUMENTS

| | | | |
|---|---|---|---|
| EP | 0403910 | A1 | 12/1990 |
| JP | 2008181562 | A | 8/2008 |

(Continued)

OTHER PUBLICATIONS

B. Babakhani and S. K. Sharma, "Dual Null Steering and Limited Beam Peak Steering Using Triple-Mode Circular Microstrip Patch Antenna," in IEEE Transactions on Antennas and Propagation, vol. 65, No. 8, pp. 3838-3848, Aug. 2017, doi: 10.1109/TAP.2017.2710198.

(Continued)

*Primary Examiner* — Timothy X Pham
(74) *Attorney, Agent, or Firm* — Fox Rothschild LLP; Carol E. Thorstad-Forsyth

(57) ABSTRACT

A signal-of-interest is received by using a first and second planar electrically conductive disc to define an antenna. The antenna produces RF signal outputs at three output ports $E_x$, $E_y$ and $E_z$, each having a different associated gain pattern and polarization response. At least one null is automatically asserted in a pattern defined by the antenna in a specified direction by selectively weighting a gain and a phase of the RF signals respectively produced from the three output ports and then combining the RF signals to produce a first receiver signal output.

24 Claims, 14 Drawing Sheets

(56) References Cited

U.S. PATENT DOCUMENTS

| | | | |
|---|---|---|---|
| 4,905,406 | A | 3/1990 | Warner |
| 4,972,196 | A | 11/1990 | Mayes et al. |
| 5,349,365 | A | 9/1994 | Ow et al. |
| 5,627,550 | A | 5/1997 | Sanad |
| 5,657,028 | A | 8/1997 | Sanad |
| 5,680,144 | A | 10/1997 | Sanad |
| 5,712,641 | A | 1/1998 | Casabona et al. |
| 6,008,762 | A | 12/1999 | Nghiem |
| 6,114,996 | A | 9/2000 | Nghiem |
| 6,160,512 | A | 12/2000 | Desclos et al. |
| 6,388,610 | B1 | 5/2002 | Przyjemski et al. |
| 6,597,316 | B2 | 7/2003 | Rao et al. |
| 6,680,704 | B2 | 1/2004 | Cassel et al. |
| 6,806,831 | B2 | 10/2004 | Johansson et al. |
| 6,930,639 | B2 | 8/2005 | Bauregger et al. |
| 7,116,323 | B2 | 10/2006 | Kaye et al. |
| 7,116,324 | B2 | 10/2006 | Kaye et al. |
| 7,495,627 | B2 | 2/2009 | Parsche |
| 7,706,458 | B2 | 4/2010 | Mody et al. |
| RE43,294 | E | 4/2012 | Stuber et al. |
| 8,373,597 | B2 | 2/2013 | Schadler |
| 8,847,825 | B2 | 9/2014 | Schadler |
| 8,952,851 | B1 | 2/2015 | Hsu et al. |
| 8,982,008 | B2 | 3/2015 | Parsche |
| 9,673,527 | B2 | 6/2017 | Yoon et al. |
| 9,825,357 | B2 | 11/2017 | Parsche |
| 9,825,373 | B1 | 11/2017 | Smith |
| 9,843,102 | B2 | 12/2017 | Lai et al. |
| 9,941,595 | B2 | 4/2018 | Yang et al. |
| 9,966,658 | B2 | 5/2018 | Fitz-Coy et al. |
| 10,128,572 | B2 | 11/2018 | Caratelli et al. |
| 2013/0035052 | A1 | 2/2013 | Musselman |
| 2017/0331186 | A1 | 11/2017 | Linn et al. |
| 2018/0269579 | A1 | 9/2018 | Bartone et al. |
| 2018/0287260 | A1 | 10/2018 | Henry et al. |
| 2019/0237873 | A1 | 8/2019 | Sazegar et al. |
| 2021/0011120 | A1* | 1/2021 | Dafesh .................... G01S 7/021 |
| 2023/0101372 | A1* | 3/2023 | Hou ....................... H04K 3/228<br>380/270 |

FOREIGN PATENT DOCUMENTS

| | | | |
|---|---|---|---|
| WO | 1997032405 | A1 | 9/1997 |
| WO | 2010029304 | A1 | 3/2010 |

OTHER PUBLICATIONS

V. Mahalwar and Y. K. Choukiker, “Study of radiation patterns of circular patch antenna at different modes,” 2017 IEEE International Conference on Electrical, Instrumentation and Communication Engineering (ICEICE), 2017, pp. 1-3, doi: 10.1109/ICEICE.2017.8192445.

N. Rezazadeh and L. Shafai, “A Compact Antenna for GPS Anti-Jamming in Airborne Applications,” in IEEE Access, vol. 7, pp. 154253-154259, 2019, doi: 10.1109/ACCESS.2019.2948823.

Long et al. “A dual-frequency stacked circular-disc antenna” IEEEE Transactions on Antennas and Propagation: 1979; vol. 27, Issue 2 https://ieeexplore.ieee.org/stamp/stamp.jsp?tp=&arnumber=1142078 Abstract Only.

Stefano Maddio “A Circularly Polarized Antenna Array with a Convenient Bandwidth/Size Ratio Based on Non-Identical Disc Elements” Progress In Electromagnetics Research Letters, vol. 57, 47-54, 2015.

Hwangbo et al. “Millimeter-Wave Wireless Intra-linter Chip Communications in 3D Integrated Circuits Using Through Glass Via (TGV) Disc-Loaded Patch Antennas” 2016 IEEE 66th Electronic Components and Technology Conference (ECTC); 8/18/61; Abstract Only.

Ma et al. :Wideband circularly polarized single probe-fed patch antenna 2012 Wiley Periodicals, Inc. Microwave Opt Technol Lett 54:1803-1808, 2012 https://doi.org/10.1002/mop.26965; Abstract Only.

Punniamoorthy et al. “Design of Patch Antenna with Omni directional radiation pattern for wireless LAN applications” Proceeding International conference on Recent Innovations is Signal Processing and Embedded Systems (RISE-2017) Oct. 27-29, 2017; pp. 5.

L3Harris “RF-7800B-VU104—Land Mobile BGAN Terminal” 2020 L3Harris Technologies, Inc. I Jan. 2020 O8427H; pp. 2.

L3Harris “N100-3 series gps antenna” https://ww.l3harris.com/all-capabilities/n100-3-series-gps-antenna.

* cited by examiner

COMPACT RECEIVER SYSTEM WITH ANTIJAM AND ANTISPOOF CAPABILITY

CROSS-REFERENCE TO RELATED APPLICATIONS

This application is a continuation-in-part of U.S. patent application Ser. No. 17/162,256, filed on Jan. 29, 2021, the disclosure of which is hereby incorporated by reference in its entirety.

BACKGROUND

Statement of the Technical Field

The technical field of this disclosure concerns Position, Navigation and Timing (PNT) systems and more particularly compact PNT systems which include capability for detection and mitigation of jamming and spoofing.

Description of the Related Art

The related art concerns methods and systems for implementing compact systems for communications involving precision navigation and timing signals in the presence of jamming and/or spoofing signals. Accurate Position, Navigation and Timing (PNT) is necessary for many critical systems in the civilian and military fields. Satellite derived PNT information is commonly used in combination with mapping data to facilitate well-known conventional navigation systems such as the Global Positioning System (GPS).

Ground based low frequency navigation such a Loran and eLoran can compete with GPS is some aspects. For instance, Loran and eLoran provide strong signals due to 1/r ground wave propagation. Legacy Loran systems may have transmitted peak powers of 100 to 500 KW. Ground based navigation systems may have less accuracy than space-based navigation, when space is not denied, and eLoran may not be available in all areas.

GPS satellite signals are particularly vulnerable to ground and aircraft-based jamming because of the great difference between the ranges involved. Consider a scenario in which a GPS satellite is overhead at 12,427 miles altitude, corresponding to a slant range of 12427 miles, and an aircraft is in a position corresponding to a 10 mile slant range. In such a scenario, the difference in wave spreading loss is 10 LOG 10 $[(12427/10)^2]$=62 dB. If the radiated powers are the same, the aircraft signal would be more than a million times stronger at a ground receiving station as compared to the space-based GPS satellite signal. Thus, much less radiated power is required for an aircraft-based transmitter to overcome a space-based GPS signal.

GPS signal transmissions are circularly polarized. This mitigates effects of Faraday Rotation as the signals pass through the ionosphere. In contrast, if linearly polarized signals are utilized for this purpose then such signals can become cross polarized.

While many GPS receive antennas are oriented, few are aimed precisely. Accordingly, broad antenna beams are typically utilized for the ground receiving station. Conventional GPS receiving antennas are typically a square microstrip patch with mitered corners. Such a conventional antenna may have a broadside firing radiation pattern, +5 to +9 dBi of realized gain and will usually have a beamwidth of less than 70 degrees. This offers insufficient protection against signals arriving from directions that deviate substantially relative to antenna boresight direction.

In some RF communication scenarios, jamming may be avoided by changing operational frequency. But changing frequency to facilitate jamming mitigation is problematic for GPS applications. User systems expect the GPS transmissions to be on predetermined frequencies. Moreover, GPS transmission already occur on two frequency bands at 1227 and 1575 MHz.

Frequency hopping is a means of changing operational frequency in a predetermined sequence to avoid jamming. But frequency hopping also has certain disadvantages when used for jamming mitigation purposes. For example, with frequency hopping, keys may need to be exchanged to facilitate the hopping process and these keys can be compromised. A further limitation of frequency hopping is lost transmission time as the hop is taking place.

FM modulation techniques can sometimes be employed to overcome external noise and or jamming. For example, systems employing FM modulation can take advantage of the well-known amplitude capture effect whereby as between two competing signals, only the signal with the greater amplitude is detected by a receiver. Unfortunately, in a GPS jammer scenario the greater magnitude signal may often be the jammer. For example, this can be the case when a space-based system with ground located receiver is challenged by nearby ground-based jammers.

Spread spectrum techniques may be another method of counteracting jamming. GPS transmissions use code division multiple access (CDMA) spectral spreading at this time. This CDMA helps distinguish individual satellites from one another as all GPS satellites use the same frequencies. Low bitrate message data is encoded with a pseudorandom code PRN sequence that is different for each satellite. Increased transmit power may be required in spread spectrum systems. Prime power to enable high power transmissions is limited in space.

Adversaries interfere with PNT solutions using two well-known methods. One such method is commonly referred to as jamming and involves generating RF signals in a particular locality which make it difficult for a receiver to detect the signals produced from orbiting GPS satellites. A second method is known as spoofing. In a spoofing scenario, an adversary produces false signals which appear to originate from authentic GPS satellites. These signals confuse a GPS receiver, thereby causing it to output false position information.

One technique for mitigating spoofing and jamming involves nulling an interfering signal by using an adaptive antenna system with multiple elements. A direction of the interfering source is automatically determined using a signal processing system and then a null is applied in an antenna pattern aligned with that direction. The RF signal strength of the interfering source is thereby greatly diminished in the GPS receiver so that the authentic satellite signals can be more easily detected.

SUMMARY

This document concerns a method and system for selectively receiving a signal-of-interest. The method involves using a first planar electrically conductive disc and a second planar electrically conductive disc concentric to and spaced apart from the first planar electrically conductive disc. The first and second discs are arranged to define an antenna that produces RF signal outputs at three output ports $E_x$, $E_y$ and $E_z$, each having a different associated gain pattern and polarization response. The method further involves automatically asserting at least one null in a pattern defined by the antenna. The null is asserted in a specified direction by selectively modifying a gain and a phase of the RF signals respectively produced from the three output ports. The null direction is controlled in accordance with a first set of weighting parameters to obtain a first plurality of weighted RF signals, and then combining the first plurality of weighted RF signals to produce a first receiver signal output.

According to one aspect, the specified direction of the null is automatically calculated based on a determination that a signal source aligned in the specified direction is a jammer or spoofer. Further, the determination that the signal source aligned in the specified direction is a jammer can be based on a relative magnitude of a received signal level as compared to a noise floor. The method can further involve communicating the first receiver signal output to a primary receiver system which is configured to process precision navigation and timing (PNT) signals.

In some scenarios, the method can include automatically asserting at least one antenna pattern beam defined by the antenna in the specified direction. This can be facilitated by selectively modifying a gain and a phase of the RF signals output from the three output ports in accordance with a second set of weighting parameters. The weighting with the second set of weighting parameters can be used to produce a second plurality of weighted RF signals. The second plurality of weighted RF signals can then be combined to produce a second receiver signal output. In some scenarios, the specified direction is automatically calculated based on a preliminary determination that a signal source aligned in the specified direction is a jammer or spoofer.

The second receiver signal output is advantageously communicated or coupled to a secondary receiver system which is configured to process PNT signals. Further, a noise signal is advantageously added to the second receiver signal output that is communicated to the secondary receiver system. The noise signal is used to increase a signal-to-noise ratio of the signal. The method can also involve classifying the second receiver signal output as a jammer signal if the second receiver signal cannot be demodulated by the secondary receiver system.

In some scenarios, the secondary receiver system is used to determine an identity of a specified satellite which is the purported source of the second receiver signal. The identity of the specified satellite is then used to determine an expected angle-of-arrival at the antenna of signals from the specified satellite. The expected angle-of-arrival can be compared to a measured or estimated angle-of-arrival of received RF signals comprising the second receiver signal to determine if the second receiver signal is associated with a spoofer.

Also disclosed herein is an antijam antispoofing precision timing and navigation (PNT) system. The system includes an antenna comprised of a first planar electrically conductive disc and a second planar electrically conductive disc concentric to and spaced apart from the first planar electrically conductive disc. The antenna includes three output ports $E_x$, $E_y$ and $E_z$ each having a different associated gain pattern and polarization response. A signal processing system is coupled to the antenna and configured to assert at least one null in a pattern defined by the antenna in a specified direction. In particular, the system is configured to assert this null by selectively modifying a gain and a phase of RF signals respectively produced from the three output ports in accordance with a first set of weighting parameters. The weighting parameters are advantageously used to produce a first plurality of weighted RF signals. The system is configured to combine the first plurality of weighted RF signals to produce a first receiver signal output.

The signal processing system is advantageously configured to automatically calculate the specified direction of the null based on a determination that a signal source aligned in the specified direction is a jammer or spoofer. According to one aspect, the signal processing system is configured to determine that the signal source aligned in the specified direction is a jammer based on a relative magnitude of a received signal level as compared to a noise floor. In the system described herein, the first receiver signal output can be coupled to a primary receiver system which is configured to process precision navigation and timing (PNT) signals.

The signal processing system is also configured to automatically assert at least one antenna pattern beam defined by the antenna in the specified direction. The signal processing system selectively modifies a gain and a phase of the RF signals output from the three output ports in accordance with a second set of weighting parameters. The weighting parameters are used to produce a second plurality of weighted RF signals. The system is advantageously arranged to combine the second plurality of weighted RF signals to produce a second receiver signal output. According to one aspect, the signal processing system is configured to automatically calculate the specified direction based on a preliminary determination that a signal source aligned in the specified direction is a jammer or spoofer.

According to one aspect, the second receiver signal output is coupled to a secondary receiver system which is configured to process PNT signals. Further, the signal processing system is configured to add a noise signal to the second receiver signal output that is coupled to the secondary receiver system to increase a signal-to-noise ratio.

In some scenarios, the signal processing system can be configured to automatically classify the second receiver signal output as a jammer signal if the second receiver signal output cannot be demodulated by the secondary receiver system. Further, the signal processing system can be configured to use the secondary receiver system to determine an identity of a specified satellite which is the purported source of the second receiver signal. In such scenarios, the signal processing system can also be configured to use the identity of the specified satellite to determine an expected angle-of-arrival at the antenna of signals from the specified satellite. Further, the signal processing system can be configured to compare the expected angle-of-arrival to a measured or estimated angle-of-arrival of received RF signals comprising the second receiver signal.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1:
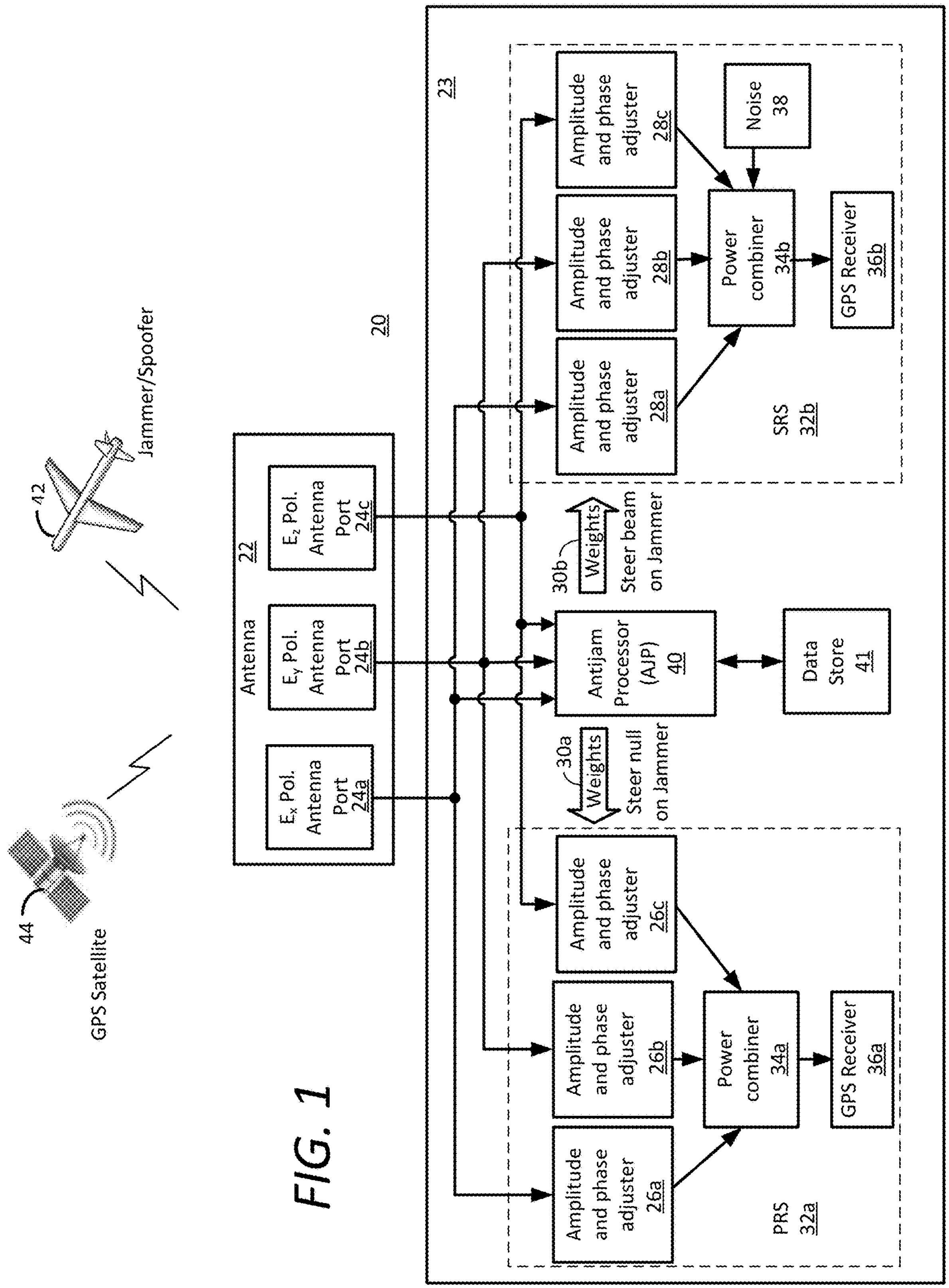
FIG. 1 is a block diagram which is useful for understanding a satellite communications system.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The methods and systems disclosed herein may provide certain advantages in a Position, Navigation and Timing (PNT) system, such as a satellite based PNT system, which requires a compact form combined with an ability to defeat jamming and spoofing. According to one aspect, these advantages are obtained by using a single compact antenna and associated signal processing system to detect and mitigate GPS PNT spoofing. In some scenarios, mitigation is facilitated by two or more steerable radiation pattern nulls which can be generated with the antenna for rejecting unwanted RF signals. In other scenarios, parallel receiver systems can be used to facilitate continuous independent reception of both authentic GPS satellite signals and jammer/spoofer signals for maintaining optimal steering of certain antenna pattern nulls and beams. The system has many applications but is particularly well suited for use in the context of a dismounted soldier or user who will carry the entire system in a pack or vest secured to his body.

System Overview

Shown in FIG. 1 is a block diagram that is useful for understanding certain aspects of a solution disclosed herein. The system 20 is designed to facilitate reception of signals from authentic PNT/GPS satellites 44 when operating in the presence of one or more jammer/spoofer sources 42. The system automatically classifies the interfering signal as either a jammer or spoofer and automatically asserts nulls in an antenna pattern to minimize any adverse effect of such jammers/spoofers.

The system 20 can be comprised of a single compact antenna 22 having 3 antenna ports 24*a*, 24*b*, 24*c* which are coupled to a signal processing system 23. As will be described in greater detail below, outputs from the three antenna ports have different pattern and polarization responses but notably are produced from the same compact antenna 22. The solution takes advantage of this feature to facilitate signal processing needed for defeating jamming and spoofing.

In some scenarios, the antenna 22 is comprised of a plurality of planar conductive structures which are stacked in a z direction along a defined axis to yield full three axis polarization information $E_x$, $E_y$ and $E_z$ for received signals. In the example shown, port 24*a* corresponds to $E_x$ polarization, port 24*b* corresponds to $E_y$ polarization, and port 24*c* corresponds to $E_z$ polarization. Phase and amplitude weighting is selectively applied to the signals from the three antenna ports whereby certain antenna patterns can be advantageously formed to help defeat jammers and spoofers. For example, the antenna patterns can facilitate formation of two or more nulls or beams in the antenna pattern as described below.

For purposes of providing antijam and antispoofing capabilities in a PNT/GPS solution described herein, the signal processing system includes three parallel receiver systems. These three parallel systems include a primary receiver system (PRS) 32*a*, secondary receiver system (SRS) 32*b*, and an Antijam Processor (AJP) 40. Each of the three receiver systems has a specific purpose. The purpose of the PRS 32*a* is to receive and process authentic GPS signals. The purpose of SRS 32*b* is to receive and process signals associated with jammers and spoofers. The purpose of the AJP 40 is to evaluate incoming signals from jammers and/or spoofers to determine a set of weights or weighting parameters 30*a*, 30*b* which are respectively provided to PRS 32*a* and SRS 32*b*.

The antenna weights 30*a*, 30*b* are comprised of phase and amplitude adjustments which are to be applied to the $E_x$, $E_y$ and $E_z$ polarization signals produced by antenna 22. The weighting parameters or weights 30*a* are generated so as to allow PRS 32*a* to generate one or more antenna pattern nulls which are directed toward a source of jamming and/or spoofing signals. The placement of the antenna pattern nulls is intended to help PRS 32*a* successfully receive authentic GPS signals by reducing the presence of signals associated with a jammer and/or spoofer. The weights provided to the SRS 32*b* are generated so as to allow SRS 32*b* to steer a beam in a direction of a source of jamming and/or spoofing signals. The beam helps isolate the jamming/spoofing signal by providing increased gain in the direction of the source of jamming/spoofing signals.

To facilitate formation of the antenna patterns described herein, each of the PRS 32*a* and the SRS 32*b* is provided with three independently operable components for adjusting amplitude and phase of incoming signals from the antenna 22. The adjusters apply phase and amplitude weights or weighting parameters to the signals produced by the three antenna ports 24*a*, 24*b*, 24*c*. For example, PRS 32*a* can include phase and amplitude adjusters 26*a*, 26*b* and 26*c* and SRS 32*b* can include phase and amplitude adjusters 28*a*, 28*b* and 28*c*. The phase and amplitude adjusters can be implemented as RF hardware elements or such adjustments can be performed numerically in software-based system. Each of the PRS 32*a* and SRS 32*b* also respectively include a power combiner 34*a*, 34*b* for combining amplitude and phase modified signals from the amplitude and phase adjusters. In some scenarios the power combiners can be implemented as RF hardware elements. However, the solution is not limited in this regard and software-based implementations are also possible.

The PRS 32*a* and SRS 32*b* can respectively include a GPS receiver 36*a*, 36*b* for respectively demodulating received GPS signals. These GPS receivers are sometimes referred to as the primary GPS receiver 36*a* and the secondary GPS receiver 36*b*. The GPS receivers 36*a*, 36*b* can each be conventional GPS receivers which include processing for solving GPS equations. GPS receivers are well-known and will not be described here in detail. However, it should be appreciated that primary GPS receiver 36*a* is provided for processing authentic GPS signals, whereas secondary GPS receiver 36*b* is provided for processing GPS spoofing signals. At least one data store 41 can be provided to facilitate operations of the AJP 40.

Antenna System

Figure 2:
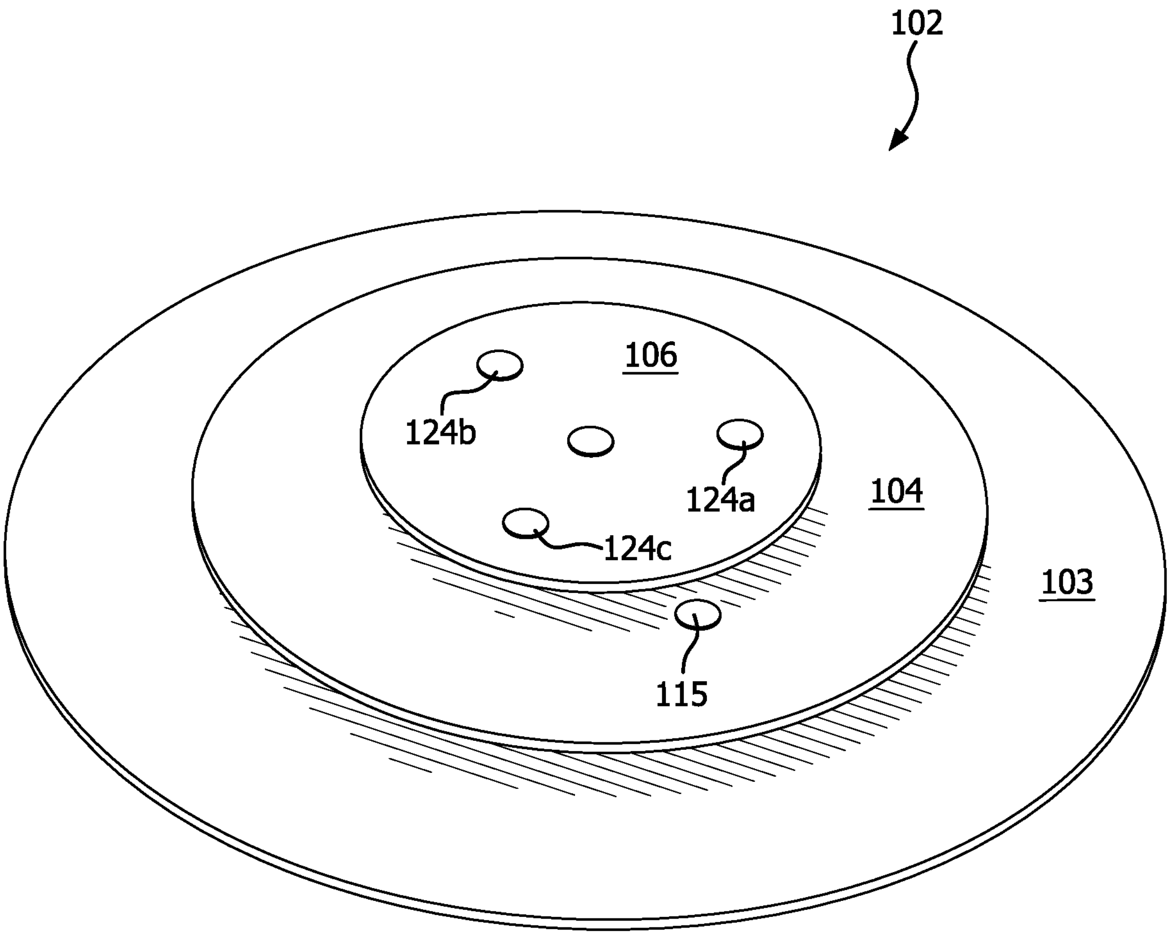
FIG. 2 is drawing showing a forward-facing or radiating side of an antenna device which can be used to facilitate the satellite communications system of FIG. 1.
Figure 3:
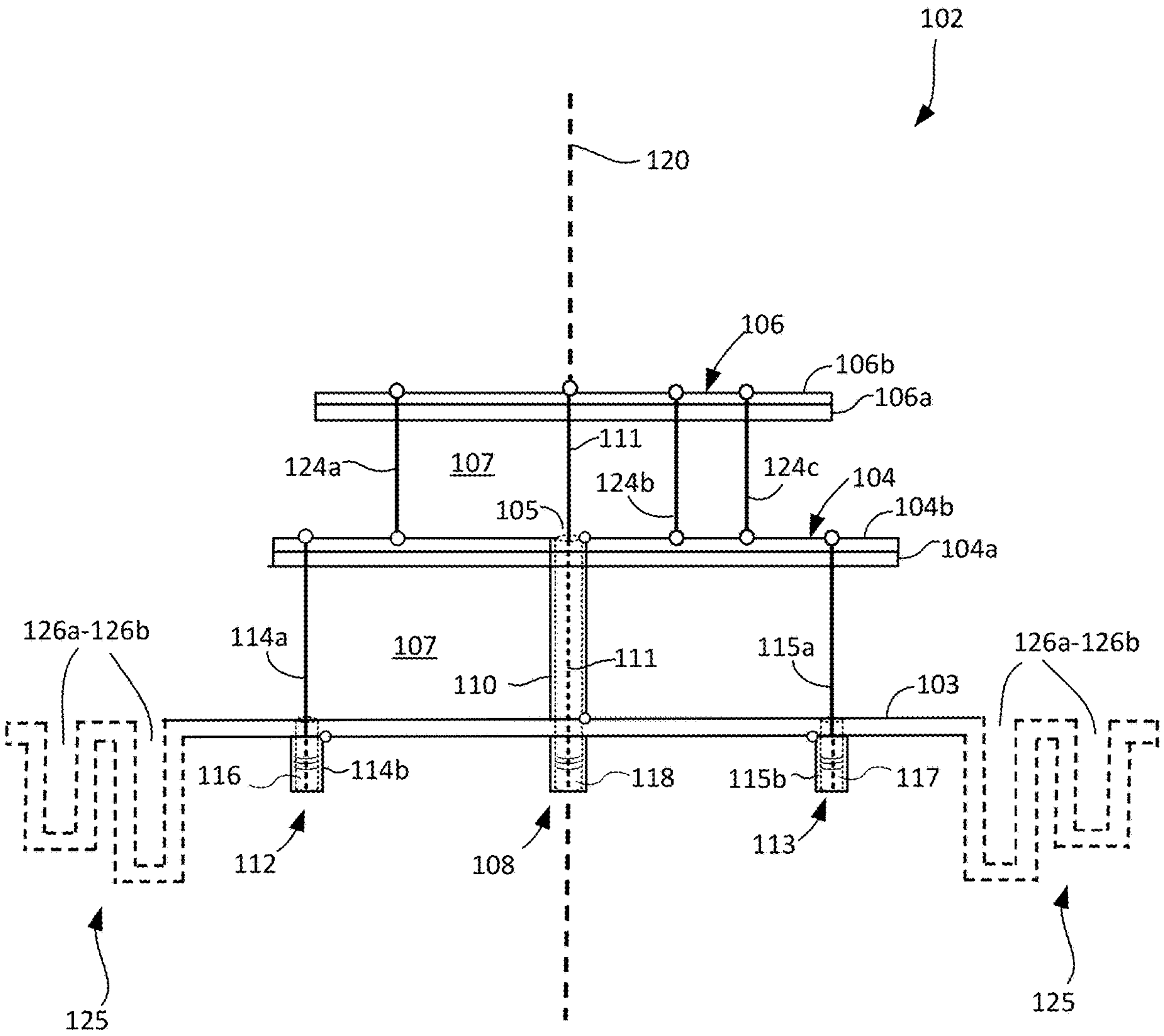
FIG. 3 is a drawing which is useful for understanding certain details of the antenna device of FIG. 2, including an optional pattern shaping portion.
Figure 4:
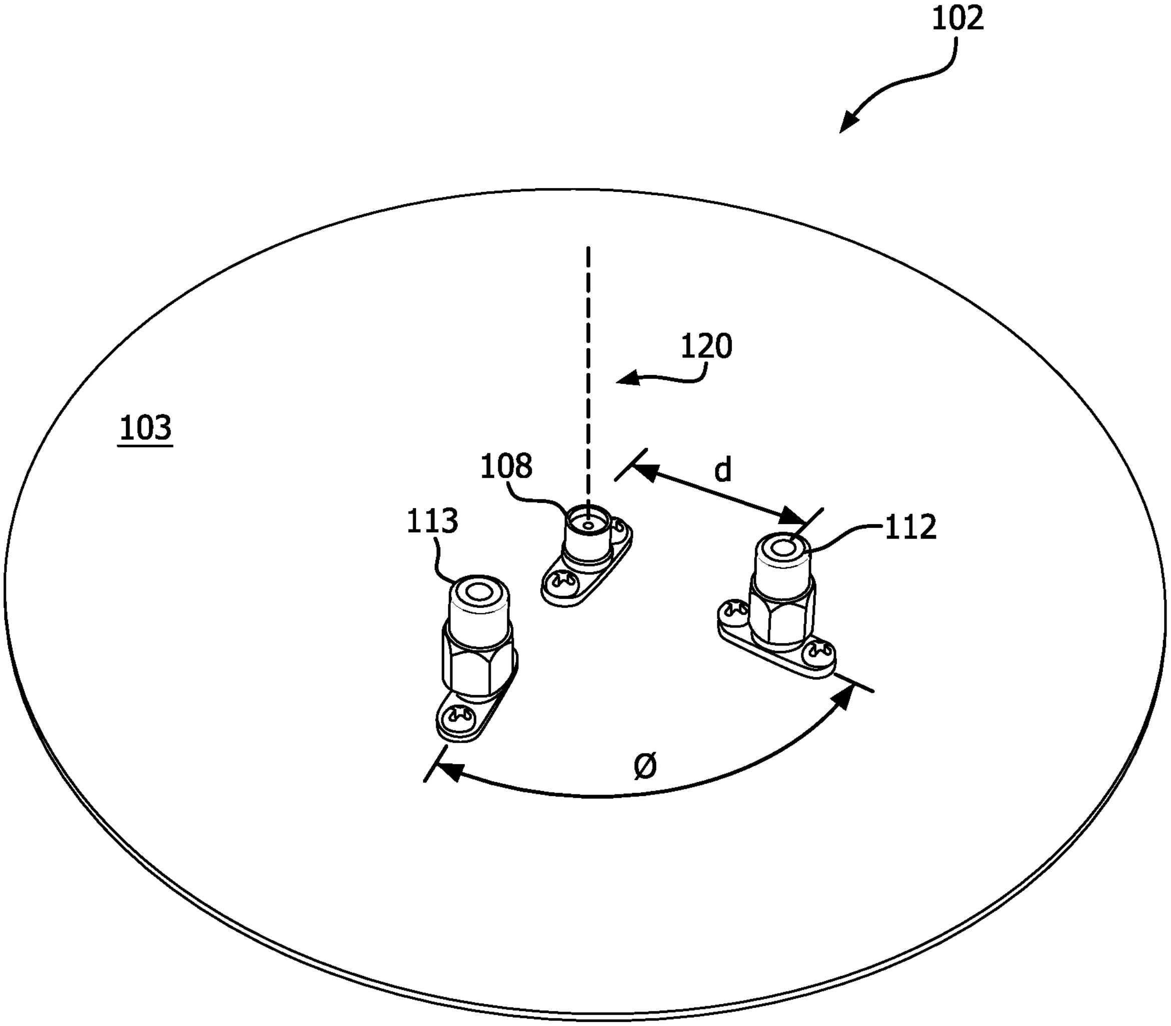
FIG. 4 is a drawing which is useful for understanding certain details of a rear-facing or feed side of the antenna device of FIG. 2.

Shown in FIGS. 2-4 are several drawings which are useful for understanding one embodiment of a compact antenna which can be used to implement the system described in FIG. 1. The antenna 102 includes a ground plane 103 formed of a conductive material. For example, in some scenarios the ground plane 103 may comprise one or more of brass, aluminum, copper, or steel. The ground plane is necessary when the antenna is carried by individual users or soldiers in a dismounted configuration as contemplated in the present solution. However, in some scenarios the antenna 102 may be deployed in a vehicle application in which case the vehicle body may provide the ground plane 103 (i.e. the ground plane is integrated with the vehicle). The antenna 102 includes a first planar component 104 spaced above the ground plane 103 and having a bore 105 therethrough. The first planar component 104 can comprise a dielectric layer 104*a* (e.g. printed circuit board), and an electrically conductive layer 104*b* (e.g. brass, aluminum, copper, silver, or steel) carried by the dielectric layer. A dielectric layer 104*a* can be useful for supporting a relatively thin conductive layer 104*b* while adding minimal weight to the overall antenna 102. In other scenarios, the thickness of the electrically conductive layer 104*b* can be increased whereby it is self-supporting such that the dielectric layer 104*a* may be omitted. Accordingly, it should be understood that the presence of the dielectric layer 104*a* can be optional in some scenarios.

The antenna 102 includes a second planar component 106 spaced above the first planar component 104 on a side of the first planar component opposite the ground plane 103. The second planar component 106 may comprise a dielectric layer 106*a* (e.g. printed circuit board), and an electrically conductive layer 106*b* (e.g. brass, aluminum, copper, silver, or steel) carried by the dielectric layer. The dielectric layer 106*a* can be useful for supporting a relatively thin conductive layer 106*b* while adding minimal weight to the overall antenna 102. In other scenarios, the thickness of the electrically conductive layer 106*b* can be increased whereby it is self-supporting such that the dielectric layer 106*a* may be omitted. Accordingly, it should be understood that the presence of the dielectric layer 106*a* can be optional in some scenarios.

The second planar component 106 has a size smaller than the first planar component 104. Also, the first planar component 104, the second planar component 106, and the ground plane 103 each illustratively has a circular shape. In the example shown, each of the circular shaped first planar component 104, the circular shaped second planar component 106, and the circular shaped ground plane 103 are parallel and concentric. Accordingly, the first and second planar components 104, 106 can be coaxially aligned along axis 120. Each of the circular shaped first planar component 104, the circular shaped second planar component 106, and the circular shaped ground plane 103 may be substantially parallel (i.e. ±15° of parallel) and substantially concentric (i.e. ±5% of concentric). In other embodiments, the first planar component 104, the second planar component 106, and the ground plane 103 may have other polygonal shapes, such as a square-shape or rectangle-shape, for example.

In the illustrated embodiment, the first planar component 104 may have a diameter in a range of 0.45-0.55 wavelengths of a center frequency at which the antenna 102 is designed to operate. The second planar component 106 may have a diameter in a range of 0.2-0.3 wavelengths of the operational frequency. The ground plane 103 may have a diameter greater than 0.45 wavelengths of the operational frequency. Further, the size of and spacing therebetween of the first planar component 104, the second planar component 106, and the ground plane 103 may be adjusted to change bandwidth of the antenna 102.

In some scenarios, the antenna 102 can include a pattern shaping portion 125 which circumferentially surrounds the ground plane 103. For example, the pattern shaping portion may comprise a plurality of corrugations 126*a*-126*b*. Two corrugations are shown in FIG. 3, but it should be understood that more or fewer corrugations are possible. The pattern shaping portion 125, when present (i.e. being an optional feature noted with dashed lines), reduces radiation behind the antenna 102 and in some instances adjusts radiation that is coplanar to the antenna. When the antenna 102 is used in dismounted operations where it is carried by an individual user, the pattern shaping portion may be omitted in some scenarios where it is desirable to minimize the amount of space occupied by the antenna.

The antenna 102 comprises dielectric material 107 between the ground plane 103 and the first planar component 104, and between the first planar component and the second planar component 106. For example, the dielectric material 107 may comprise at least one of air and a dielectric foam, or a solid dielectric material, such as Teflon. The diameter of the first planar element 104 is given by $d=0.51\lambda/\sqrt{(\varepsilon_r\mu_r)}$, where $\lambda$=the free space wavelength of a design center frequency, $\varepsilon_r$ is the relative permittivity of the dielectric material 107, and $\mu_r$ is the relative permittivity of the dielectric material 107 (if any).

The antenna 102 comprises a first coaxial feed 108 comprising an outer conductor 110, an inner conductor 111 surrounded by the outer conductor and extending outwardly from an end of the outer conductor, and an insulating sheath 118 surrounding the inner conductor. The outer conductor 110 is electrically connected to the ground plane 103 and the first planar component 104. The inner conductor 111 extends through the bore 105 in the first planar component 104 and is electrically connected to the second planar component 106.

The antenna illustratively includes a second coaxial feed 112, and a third coaxial feed 113, each being spaced from the first coaxial feed 108. Each of the second coaxial feed 112 and the third coaxial feed 113 comprises an inner conductor 114*a*, 115*a* electrically connected to the electrically conductive layer 104*b* of the first planar component 104, and an insulating sheath 116, 117 surrounding the inner conductor where it passes through the ground plane. An outer conductor 114*b*, 115*b* can surround the inner conductor to define a portion of a connector and is connected to the ground plane 103. For example, the first coaxial feed 108, the second coaxial feed 112, and the third coaxial feed 113 may respectively comprise a connector as shown in FIG. 4. In the illustrated embodiment, the connectors each comprise a coaxial female connector. The second coaxial feed 112 and the third coaxial feed 113 are angularly spaced apart for different antenna polarizations.

The three different coaxial feeds facilitate three output ports which each contain different amplitude and polarization information associated with incoming signals, including an x polarization, a y polarization, and a z polarization. For example, the first coaxial feed 108 may define a z polarization port, whereas the second coaxial feed 112, and the third coaxial feed 113 may respectively comprise x and y polarization ports. The first coaxial feed 108 can be aligned along the axis 120, whereas each of the second and third coaxial feeds are radially offset from the axis 120 by a predetermined distance d. Further, the third coaxial feed 113 can be angularly offset from the second coaxial feed 112 by an angle ø, In some embodiments, the angle is advantageously selected to be about 90° to facilitate x and y polarizations.

In the illustrated embodiments, the antenna 102 includes a plurality of conductive pins **124*a*-124*c* coupled between the first and second planar components 104, 106. The plurality of conductive pins 124*a*-124*c* may comprise one or more electrically conductive materials, such as brass, copper, aluminum, or silver. Each of the plurality of conductive pins 124*a*-124*c* is electrically coupled to the electrically conductive layers 104*b*, 106*b* of the first and second planar components 104, 106. The respective locations of the plurality of conductive pins 124*a*-124*c* may be adjusted to control the driving resistance of the second planar component 106**.

The first planar component 104 comprises a broadside firing part of the antenna with a Bessel zero resonance disc providing $E_x$ and $E_y$ polarizations and cosine patterns. The second planar component 106 provides a coplanar firing/omni toroid radiation pattern antenna element with a fundamental resonance disc providing $E_z$ polarization and a sine pattern.

While the antenna 102 is not so limited, parameters of an example implementation of the antenna 102 are presented in Table 1:

TABLE 1

Parameters of an Example Implementation of the Antenna

| Parameter | Value | Comments |
|---|---|---|
| Frequency of operation | 1575.42 MHz | |
| Conductive ground plane 103 material | 0.020 inch thick FR4 printed circuit board | Could be sheet metal |
| Diameter of conductive ground plane 103 | 5.800 inches | May be varied |
| Pattern shaping portion 125 | Not present this example | |
| Diameter of conductive first planar component 104 | 3.900 inches | Sets frequency of operation |
| Diameter of conductive second planar component 106 | 2.180 inches | Sets frequency of operation |
| First planar antenna element 104, second planar component 106 material | 0.020 inch thick FR-4 printed circuit board | Could be sheet metal as well |
| Distance between top surface of ground plane to bottom surface of conductive first planar component 104 | 0.375 inches | |
| Distance between top surface of ground plane and bottom surface of conductive second planar component 106 | 0.759 inches | |
| Location of inner conductor 114a/the X polarization port | x = 1.100, y = 0.00 inches | |
| Location of inner conductor 115/the Y polarization port | X = 0.000, y = 1.100 inches | |
| Diameter of inner conductor 114a, 115 | 0.050 inches | Brass material |
| Pin 124a-124c location | 0.310 inches out from center, spaced every 120 degrees | Spacing from center adjusts resistance |
| Conductive pin 124a-124c diameter | 0.030 inches | Brass |
| Outer conductor 110 | 0.085 inches outer diameter | Outer conductor 110 is a segment of first coaxial feed 108 |
| Coaxial feed 108 | RG-405/0.085 inch semi rigid coaxial cable | $Z_0$ = 50 ohms |

Advantageously, the antenna 102 is quite flexible in operation. The illustrated embodiment can provide an x polarization port, a y polarization port, and a z polarization respectively at the connection ports 112, 113, 108. The planar shape of the antenna 102 makes packaging easier for dismounted applications where the antenna may be secure to a pack or a vest carried by a user. Indeed, the antenna 102 can provide complimentary radiation patterns (i.e. sine and cosine), omnidirectional radiation patterns, unidirectional radiation patterns, and radiation pattern shapes in between. The antenna 102 can also generate pattern nulls in directions determined by weighting applied to signals generated at the x polarization port, y polarization port and z polarization port.

The disc 104 would by itself provide a broadside radiation pattern and the disc 106 by itself a coplanar radiation pattern. Thus the two discs 104, 106 usefully provide substantially complimentary radiation patterns. Together they provide hemispherical plus pattern coverage if the excitation is blended. Isoflux radiation patterns are possible as one disc has a null broadside useful for satellite nadir.

A theory of operation for the antenna 102 will now be described. Starting from the bottom up, the electrically conductive ground plane 103 acts as an image plane to the first planar component 104 so a virtual mirror image of the first planar component and an apparent second source of radio waves is located an equal distance under the ground plane 103. The ground plane 103 diameter somewhat adjusts the radiation pattern beamwidth of the first planar component 104 and a minimum first planar component beamwidth may occur for a ground plane radius of λ/2. The ground plane 103 is in general not a resonant structure, so its diameter may be varied without changing frequency of operation. The plurality of corrugations 126*a*-126*b*, if present, act to cause a high impedance to the flow of RF electric currents on the ground plane 103 peripheral surface, which in turn suppresses the conveyance of surface waves on the surface of the pattern shaping portion 125. The wave diffraction around the ground plane 103 rim is reduced and radiation in the half space below the ground plane 103 may thus be regulated to a level desired.

The second planar component 104 acts as a broadside firing microstrip patch antenna. Thus, the circumference of the second planar component 104 is near 1.58 wavelengths or slightly less. Slot type radiation exists between the rim of the second planar component 106 and the first planar component 104 and slot mode radiation may predominate over monopole radiation when the second planar component and the first planar component are closely spaced, as with close spacing the region between the second planar component and the first planar component is too close together for a wave to fit inside. Radiation from the second planar component 106 is mostly broadside the ground plane 103 and a modified cosine function in shape.

The first planar component 104 can be said to comprise a ground plane to the second planar component 106, so the antenna element 104 performs compound duties. The first planar component 104 develops a radiation resistance under 50 ohms so conductive pins 124*a*, 124*b*, 124*c* are present to convert the radiation resistance to a driving resistance of 50 ohms or other desired value. Conductive pins 124*a*, 124*b*, 124*c* may comprise electrical folds such that fields from pins 124*a*, 124*b*, 124*c* buck or oppose the fields from outer conductor 110. The current flow in the conductive pins 124*a*, 124*b*, 124*c* is in a reverse direction to the flow of current on the inner conductor 111 such that the near fields surrounding the structures are opposing. This generates a work mechanism so to speak the cause the second antenna 106 driving resistance rise.

The diameter of the second planar component 106 trades with height above the first planar component 104. When the second planar component 106 is very close to first planar component 104, the second planar component may have a diameter approaching λ/4. When the second planar component 106 is more elevated above the first planar component 104, the second planar component 106 provides a lower radiation resistance. The conductive pins 124*a*, 124*b*, 124*c* are always available to convert the range of radiation resistances to 50 ohms. Radiation from the second planar component 106 is mostly in the antenna plane and a modified sine function in shape.

In the antenna solution described herein, it is important to recognize that the first and second planar components are not separate antenna elements of a phased array antenna. Similarly, the three output ports do not correspond to outputs of separate antenna elements. It should be noted that use of conventional phased array antennas for beam forming is well known and generally involves a plurality of separate antennas (commonly referred to as antenna elements) which are periodically distributed in a plane. The individual antenna elements of a conventional phased array antenna are typically spaced apart from each other by a predetermined physical distance and are commonly arranged in accordance with a one dimensional or two-dimensional pattern. But all of the antenna elements are typically arranged in a common plane. The individual separate feeds from each of the independent antenna elements are then weighted and combined to form desired antenna patterns. But in such a conventional scenario, the individual antenna elements of the array do not share a common phase center. Instead, they are periodically distributed in an array with some predetermined spacing. These systems work well but can be physically large depending on the number of array elements and the operating wavelength of the signals.

In contrast, the antenna solution described herein is comprised of one antenna (albeit with several component parts) and does not comprise an array of antenna elements. In this regard, the antenna solution disclosed herein is unlike conventional phased element arrays. In the antenna solution disclosed herein, signals from all of the separate output ports are derived from one physical antenna having a single common phase center. As is known, a phase center of an antenna is that physical location in space at which an antenna appears to be measuring a received signal from. An antenna system comprised of only one element and thereby defining a single phase center will not normally support electronic beam steering using phased array techniques. However, the separate polarization responses that are uniquely associated with each of the three antenna ports of the single antenna described herein does allow antenna pattern shaping to produce beams and or nulls in a desired direction.

This antenna pattern shaping is similar in some respects to conventional phased array methods but is unlike those conventional methods insofar as it does not require a planar array of antenna elements. Further, the manner of steering antenna pattern beams and nulls in the solution described herein is mathematically distinct from conventional array steering methodologies. This steering and shaping is made possible in part because the generated output signals at the three antenna ports are individually distinct from one another with regard to polarization response but share a common physical phase center. These features of the antenna are highly advantageous in scenarios which require antenna pattern shaping in a very compact antenna platform, as is needed for dismounted antijamming applications.

Antijam, Antispoof Processing

Figure 5A:
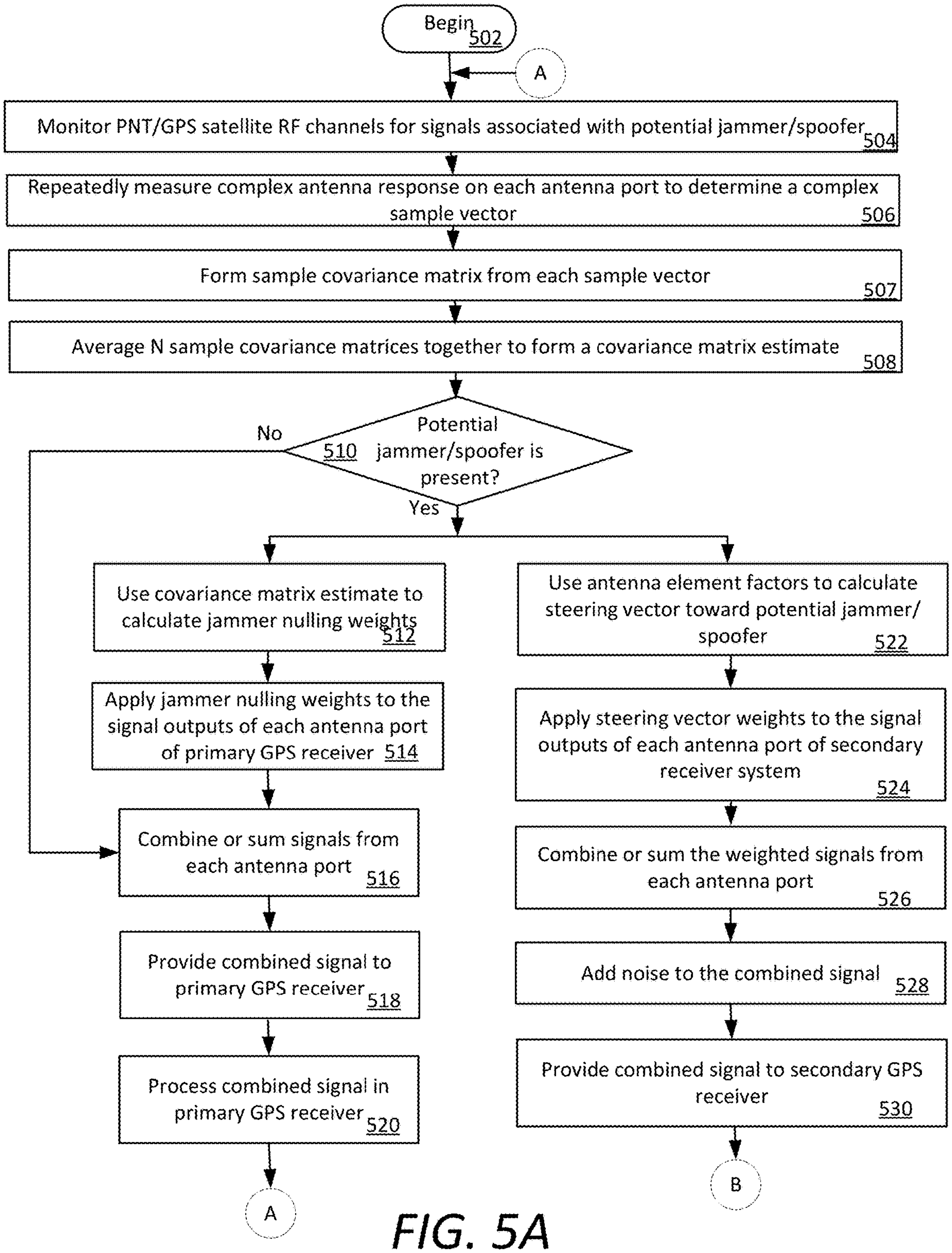
FIGS. 5A-5C comprise a flowchart that is useful for understanding a process for reducing the effects of a jammer signal.
Figure 5B:
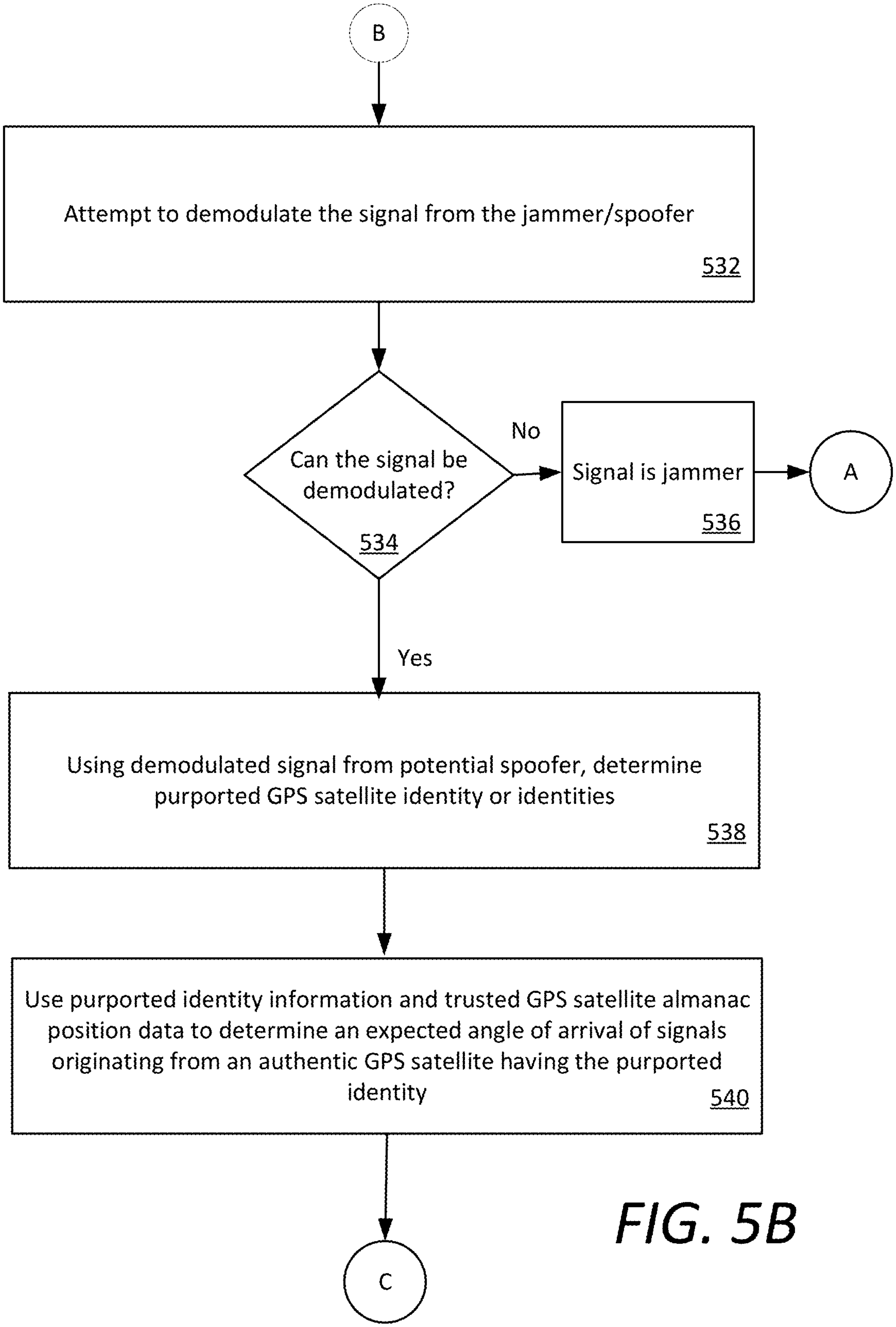
Figure 5C:
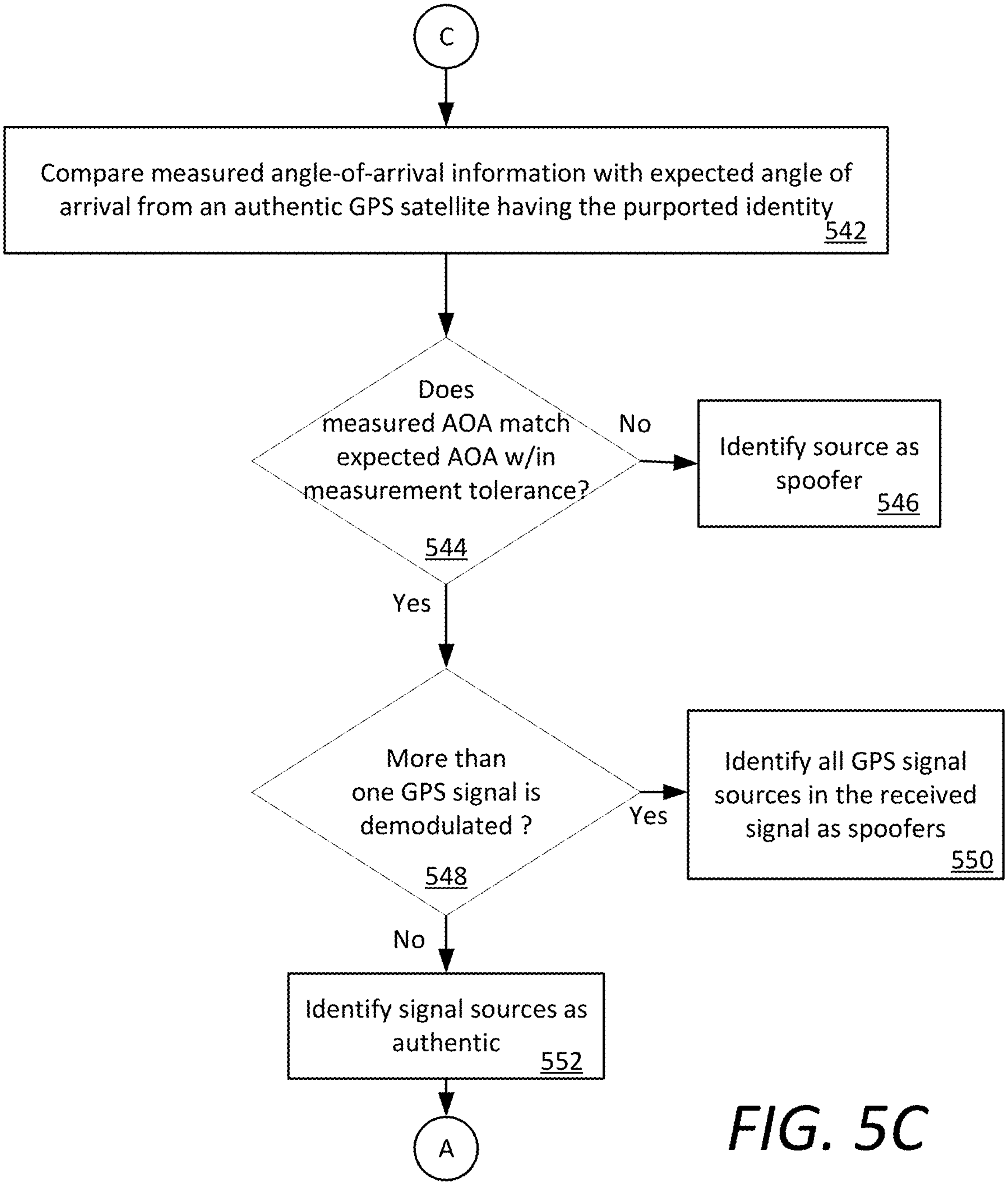

Referring now to FIGS. 5A-5C (collectively referred to herein as FIG. 5), a flowchart is provided which is useful for understanding certain aspects of a solution disclosed herein. As shown in FIG. 5, the process begins at 502 and continues to 504 where RF channels associated with PNT/GPS satellite signals are monitored. This operation can involve receiving RF signals from a plurality of output ports of an antenna (e.g. antenna 22) and communicating such signals to an antijam processor (AJP) 40 for processing. At 506 the system performs actions to repeatedly measure a complex antenna response (i.e., phase and amplitude) associated with signals at each antenna port. For example, the complex antenna response can be measured N times, where N is an integer greater than one. Each of the N measurements produces a complex sample vector comprised of amplitude and phase information. At 507 a sample covariance matrix is respectively formed from each of the N sample vectors. The sample covariance matrix in each instance is calculated in a conventional manner based on the incoming received RF signals. The resulting N sample covariance matrices are then averaged together at 508, to form a covariance matrix estimate.

The repeated measurements necessary to form N sample covariance matrices at 506-508 are performed based on received signals over a brief period of time. The duration of this brief period of time is advantageously selected so that any movement of a dismounted user carrying the antenna 22 will be insubstantial. For example, the duration of time may be less than 1 second or less than 500 milliseconds. Consequently, the sample covariance matrices associated with such evaluation will remain substantially coherent with each other over several iterations. This allows the sample covariance matrices to be averaged together to form a covariance matrix estimate. Averaging the matrices together in this way can help reduce the effects of noise and improve the accuracy of the estimate.

At 510 a preliminary determination is made as to whether a potential jammer/spoofer may be present. Various algorithms can be applied to make this determination. In some scenarios such a determination can be based on an evaluation of a received signal strength indication (RSSI) of those signals which are detected in the PNT/GPS RF channels which are being monitored. In particular, signals from authentic GPS satellites 44 can be differentiated from signals associated with likely jammers and spoofers 42 based on an expected difference in received signal strength.

Signals from authentic GPS satellites 44 are typically received by terrestrial receivers at levels which are below the noise floor. Under normal conditions, conventional correlation/de-spreading operations are performed in the GPS receiver (e.g. GPS receiver 36*a*, 36*b*) to extract the authentic GPS satellite signals from the noise. Such authentic signals will not influence the covariance matrix estimate obtained at 508 because, absent de-spreading they are not detected in the AJP. In contrast, one or more signals from a jammer or spoofer 42 are often produced by sources located in aircraft which are in relatively close proximity to a terrestrial receiver system. As such, the signals from the jammer or spoofer are usually received at signal levels above the noise floor. So, the sample covariance matrices formed in step 507 and the resulting covariance matrix estimate obtained at 508 will be derived exclusively from the jamming or spoofing signal when such signals are present. So, a preliminary determination as to whether or not a jammer/spoofer is potentially present can be made at 510 based on the detected presence of a detectable in-band signal in the RF channel. The foregoing is one possible method for making a preliminary evaluation regarding a potential or likely jammer presence. However, the solution is not limited in this regard and other algorithms can also be applied.

If a determination is made at 510 that a potential jammer/spoofer is not present (510: No) then the process can continue on to 516 where conventional processing of signals from authentic GPS satellites is performed as described below. However, if the preliminary determination is that a jammer/spoofer may be present (510: Yes) then the process continues on to perform operations associated with 512-520 and 522-530. In FIG. 5A the operations at 512-520 are shown as being performed in parallel with the operations at 522-530. However, it should be understood that the solution is not limited in this regard and in other scenarios these operations may performed in a serial order.

The operations at 512-520 relate to processing intended to facilitate receipt of signals associated with authentic GPS satellites. The operations at 522-530 and subsequent operations at 532-552 are intended to facilitate a further evaluation of the potential jammer/spoofer. For example, these steps can involve a conclusive determination of (1) whether or not the signals originate with an authentic GPS satellite, and (2) whether such signal is identified as a jammer versus a spoofer.

Referring now to the operations at 512-520, the covariance matrix estimate from 508 is used at 512 to calculate jammer nulling weights. These jammer nulling weights are comprised of gain and phase adjustments. The method continues at 514 at which point the jammer nulling weights are respectively applied by the amplitude and phase adjusters (e.g., amplitude and phase adjusters 26*a*-26*b*) to incoming signals from each antenna port (e.g., antenna ports 24*a*-24*c*). At 516 the weighted signals from the amplitude and phase adjusters 26*a*-26*c* are combined or summed in a power combiner (e.g., power combiner 34*a*).

The use of a covariance matrix to generate nulls in an antenna pattern is well-known in the art and therefore will not be described in detail. In the solution described herein, application of these weights to received signals is used to effectively insert nulls in the antenna pattern in one or more vector directions (azimuth and elevation). For example, in FIG. 7 a pattern null can be inserted in a vector direction 702 which is aligned with potential jammer and/or spoofer 42 as identified at 510. These nulls will reduce the presence of signals originating from the potential jammer/spoofer, thereby allowing signals from authentic GPS satellites to be received. At least two independent radiation pattern nulls at arbitrary look angles may be formed. The produced nulls are steep skirted such that they have little reduction in GPS signal strength in most instances.

The combined or summed signal from 516 is provided at 518 to the primary GPS receiver 36*a*. At 520 conventional correlation processing is performed by the ground station to extract PNT information from one or more GPS signals originating from authentic GPS satellites. The process can then end or return to 504 to update the covariance matrix estimate and/or potentially detect other jammers/spoofers.

Referring now to 522-530 the covariance matrix estimate from 508 is used at 522 to calculate a steering vector. The steering vector that is calculated is advantageously directed toward the source of a signal which has been identified at 510 as being a likely jammer/spoofer 42. For example, in FIG. 7 the steering vector that is calculated can be aligned in vector direction 702. At 524 steering vector weights comprised of gain and phase adjustments are respectively applied to signals from each of the output ports of the antenna. For example, these weights can be applied by amplitude and phase adjusters 28*a*-28*c*. The weighted signals are then combined or summed at 526 (e.g., in a power combiner 34*b*.)

The use of a covariance matrix to generate a steering vector is well-known in the art and therefore will not be described in detail. However, it should be understood that application of these steering vector weights to received signals from the antenna ports can be used to effectively form an antenna pattern which defines a relatively high-gain beam in vector direction 702 (azimuth and elevation) which is approximately aligned with a source that has been previously identified as a potential jammer and/or spoofers. This beam directed toward the jammer/spoofer source 42 will increase the RSSI of signals originating from the potential jammer/spoofer.

The method continues at 528 at which point noise is added to the combined signal. In some scenarios, the noise can have a Gaussian distribution and may be provided by a noise source 38. This addition of noise to the received signal naturally has the effect of reducing a signal-to-noise ratio (SNR) of the jammer/spoofer signal but has the benefit of further reducing the SNR of signals received from the authentic GPS satellites. Consequently, this addition of noise helps to isolate signals from the jammer/spoofer within the beam of the antenna pattern.

The resulting noise plus signal is then provided at 530 to the secondary GPS receiver **36*b*. At this receiver, conventional correlation processing can be performed at 532 so as to attempt to extract PNT information from the signals. At 534** a determination is made as to whether the received signal from the suspected jammer/spoofer can be demodulated. This operation can be performed by using the AJP to monitor one or more outputs of the secondary GPS receiver. Notably, signals from a spoofer will be specifically configured to emulate or imitate signals from an authentic GPS satellite. Accordingly, it is expected that the secondary GPS receiver will be able to demodulate and decode such signals, notwithstanding that they may originate with a spoofer. In contrast, signals from a jammer source will typically comprise noise or some other random pattern that cannot be demodulated and/or decoded.

If a determination is made that the received signals cannot be demodulated (534: No) then the received signal is declared at 536 to be a jammer and the process may end or return to 504 to perform additional signal monitoring operations. However, if the received signals can be successfully demodulated and decoded (534: Yes) then the process continues on to 538. At this point in the process, it is known that the signal which is being evaluated is not in fact a jammer. However, a further evaluation is performed to definitively determine whether the signal should be properly designated as a spoofer.

At 538 data is extracted from the demodulated and decoded signal to determine an identity of a GPS satellite that is the purported source of such signal. In a spoofing scenario, an adversary can employ one or more RF emitters which emulate the types of signals that are expected from an authentic GPS satellite. These signals may also contain false information concerning the purported identity of the satellite which is the source of such signals. For example, signals from a spoofer may indicate that the satellite is a particular authentic GPS satellite.

Figure 7:
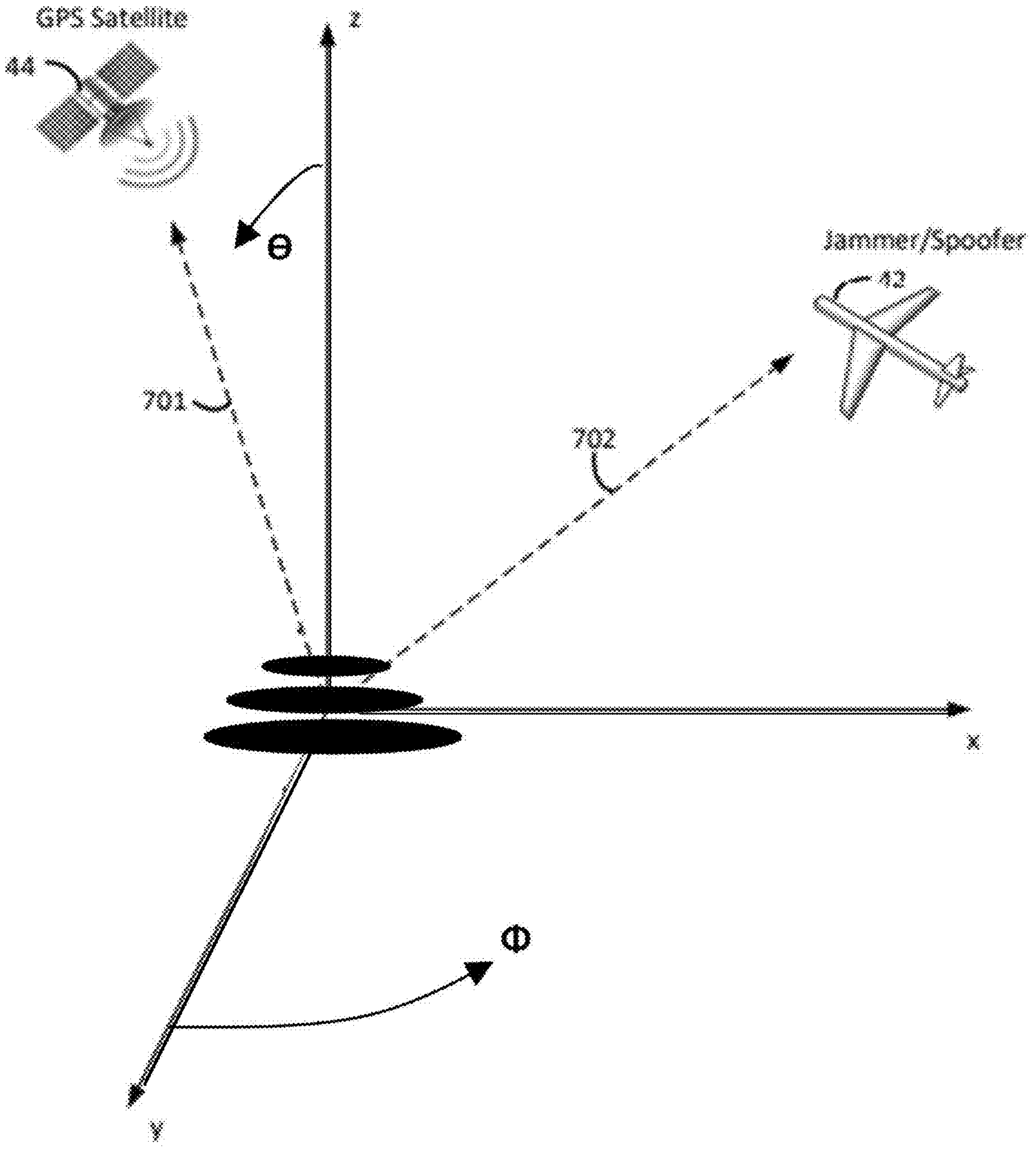
FIG. 7 is a drawing which is useful for understanding certain signal processing operations performed for isolating and evaluating a jamming or spoofing signal.

The process continues on to 540 where the identity information obtained at 538 is used to determine an expected vector angle of arrival (AOA) of signals originating from the particular GPS satellite which was identified. This can be accomplished by conventional means using the satellite identity information in combination with trusted GPS satellite almanac position data. In some scenarios, such trusted GPS satellite almanac position data can be stored in data store 41. For example, such almanac position data for authentic GPS satellites can be contained in a look up table (LUT) stored in a memory location accessible to the AJP. Alternatively, the information can be computed by the AJP based on the known orbital characteristics of one or more GPS satellite. Using the foregoing information, the AJP can determine an estimated geospatial position of the GPS satellite which was indicated at 538. The AJP can then calculate for a given location on earth an expected AOA of signals from a source having the particular geospatial position which has been determined. In FIG. 7 an expected AOA of an authentic GPS satellite 44 aligned in vector direction 701 is defined by an elevation angle ø and an azimuth angle Θ.

At 542 a comparison is made as between the measured AOA of the suspected jammer/spoofer (i.e., based on the steering vector 702) and the expected AOA of signals originating from an authentic GPS satellite and having the claimed identity (as specified at 538). At 544 a determination is made as to whether the measured AOA matches the expected AOA within a measurement tolerance. If not (544: No), then the signal under evaluation is positively identified as a spoofer at 546. However, if the measured AOA appears to be correct (544: Yes) then a second evaluation can be made at 548. In particular, at 548 the AJP can evaluate whether the secondary GPS receiver **36*b* is receiving more than one PNT/GPS signal originating from the same AOA. If so (548: Yes), then the AJP can identify all such signals originating along the particular measured AOA as being produced by a spoofer. A plurality of signals from authentic GPS satellites are expected to arrive along different angles-of-arrival because the satellites will have different geospatial positions. Authentic GPS satellites will have distinct orbits and positions such that their signals will arrive at a terrestrial antenna from distinct directions. If two or more such PNT/GPS received signals are determined to have the same angle of arrival, then the received signals can be declared as originating with a spoofer. If a determination is made at 548 that only one signal is being received along a particular angle-of-arrival, then at 552 the AJP can declare the signal source to be an authentic GPS satellite. Thereafter, the process can then end or continue with additional processing steps. For example, the process can return to 504** to resume monitoring operations.

The AJP 40 described herein can be comprised of one or more components such as a processor, an application specific circuit, a programmable logic device, a digital signal processor, or other circuit programmed to perform the functions described herein. A typical combination of hardware and software can be a general-purpose computer system coupled to an RF processing circuit. The general-purpose computer system can have a computer program that can control the computer system such that it carries out the methods described herein. Embodiments can be realized in one computing system or several interconnected computer systems. Any kind of computer system or other apparatus adapted for carrying out the methods described herein is suited. The computer system can have a computer program that can control the computer system such that it carries out the methods described herein. A computer system as referenced herein can comprise various types of computing systems capable of executing a set of instructions (sequential or otherwise) that specifies actions to be taken by that device.

Figure 6:
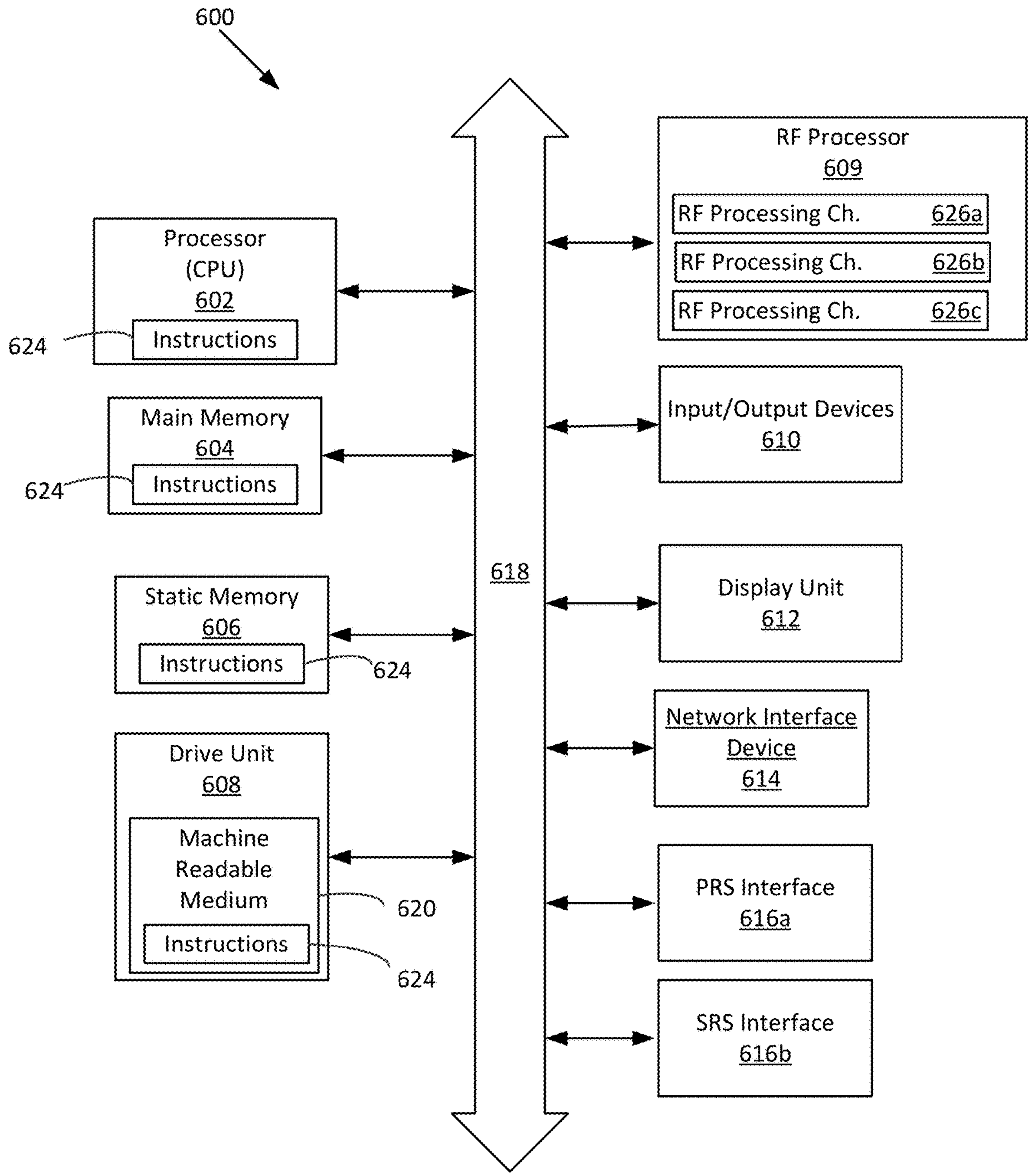
FIG. 6 is a block diagram of an exemplary antijam processing system that can perform signal processing operations as described herein.

Shown in FIG. 6 is a hardware block diagram that is useful for understanding an exemplary system 600 which can perform the functions of the AJP 40. The system can include a computer processor and a set of instructions which are used to cause the computer system to perform any one or more of the methodologies discussed herein. In some embodiments, the system 600 can operate independently as a standalone device. However, embodiments are not limited in this regard and in other scenarios the system can be operatively connected (networked) to other machines in a distributed environment to facilitate certain operations. Accordingly, while only a single system is illustrated it should be understood that embodiments can be taken to involve any collection of devices that individually or jointly execute one or more sets of instructions as described herein.

The system 600 can be comprised of a processor 602 (e.g. a central processing unit or CPU), a main memory 604, a static memory 606, a drive unit 608 for mass data storage and comprised of machine readable media 620, an RF processing unit 609, input/output devices 610, a display unit 612 (e.g. a liquid crystal display (LCD) or a solid state display), and a network interface device 614. Communications among these various components can be facilitated by means of a data bus 618. The system can also include an PRS interface 616*a*, and an SRS interface 616*b* which respectively facilitate data communications with PRS 32*a*, and SRS 32*b*. One or more sets of instructions 624 can be stored completely or partially in one or more of the main memory 604, static memory 606, and drive unit 608. The instructions can also reside within the processor 602 during execution thereof by the computer system. The input/output devices 610 can include a keyboard, a mouse, a multi-touch surface (e.g. a touchscreen) and so on. The network interface device 614 can be comprised of hardware components and software or firmware to facilitate wired or wireless network data communications in accordance with a network communication protocol.

The drive unit 608 can comprise a machine readable medium 620 on which is stored one or more sets of instructions 624 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

RF processor 609 can include a plurality of RF processing channels 626*a*, 626*b*, 626*c* which are respectively capable of processing RF signals from the output ports 24*a*, 24*b*, 24*c* of antenna 22. Each of these RF processing channels can include conventional RF filtering, down-conversion, and detection circuits (not shown) which are configured to convert analog RF signals from the antenna 22 into a digital data format suitable for digital signal processing. Such processing can be performed by processor 602.

System 600 should be understood to be one possible example of a AJP 40 which can be used in connection with the various embodiments. However, the solution is not limited in this regard and any other suitable system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Figure 8:
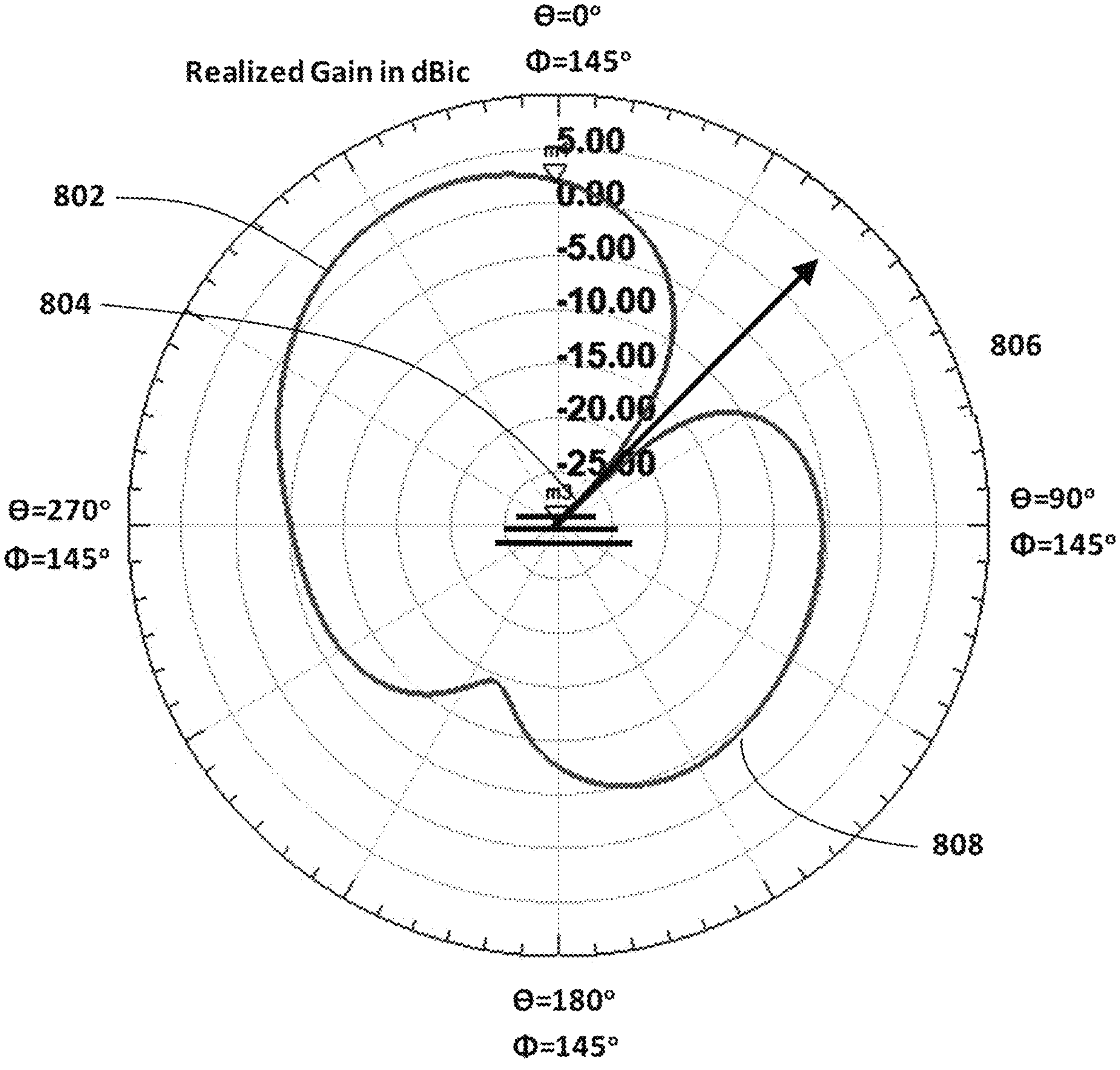
FIG. 8 is a radiation pattern example of the antenna device and antijam system in operation against a jamming signal.

FIG. 8 provides an example of an interference reducing radiation pattern formed by the present invention. It is in IEEE-145 standard radiation pattern coordinates as depicted in FIG. 7. Single compact antenna 22 structure is in the XY plane. An elevation cut radiation pattern is plotted at a constant azimuth angle of Φ=145°. Accordingly, elevation angle Θ is varied from 0° to 360° in the FIG. 8 diagram. Trace 802 depicts amplitude in units of dBic or decibels with respect to an isotropic reference antenna with circular polarization. Right hand circular polarization was used here as this is the US Global Positioning System standard. Operating frequency was L1 which is 1575.42 MHz. A radiation pattern null 804 has been provided against the hypothetical jammer at a look angle of Θ=45°, Φ=145°. The null has a realized gain of −29.8 dBic amplitude. As an example of the interference reduction, consider that for a GPS satellite at overhead at Θ=0°, Θ=0° the radiation pattern intensity is +2.5 dBic. So, the hypothetical jammer is rejected by an amplitude of +2.5 dBic−(−29.8) dBic=32.3 dB relative the desired signal. This is more than 1000 to 1 reduction in received jammer power. The system directs the null towards the jammer rather than the lobe towards the desired signal as the null has the steepest skirts in radiation patterns. The element weights/coaxial feed excitations used in the FIG. 8 example were as set forth in Table 2:

TABLE 2

FIG 8. Example Port Excitations/Element Weights

| Port/feed | Amplitude | Phase |
|---|---|---|
| Second coaxial feed 112 (X axis feed) | +1 volts | 0 degrees |
| Third coaxial feed 113 (Y axis feed) | +3.93 volts | −179.5 degrees |
| First coaxial feed 108 (Z axis feed) | +5.0 volts | −179.5 degrees |

These element weights used in the FIG. 8 example were obtained by the covariance matrix method described herein. A far field antenna range was used to measure the FIG. 8 pattern with the jammer and desired signal antennas at 10 wavelengths distance. Right hand circular polarization dipole turnstiles were used as the jammer and desired signal source antennas. The present invention is not so limited as to providing nulls only at this look angle. It is operable with arbitrary polarization and can provide a plurality of nulls.

Figure 9A:
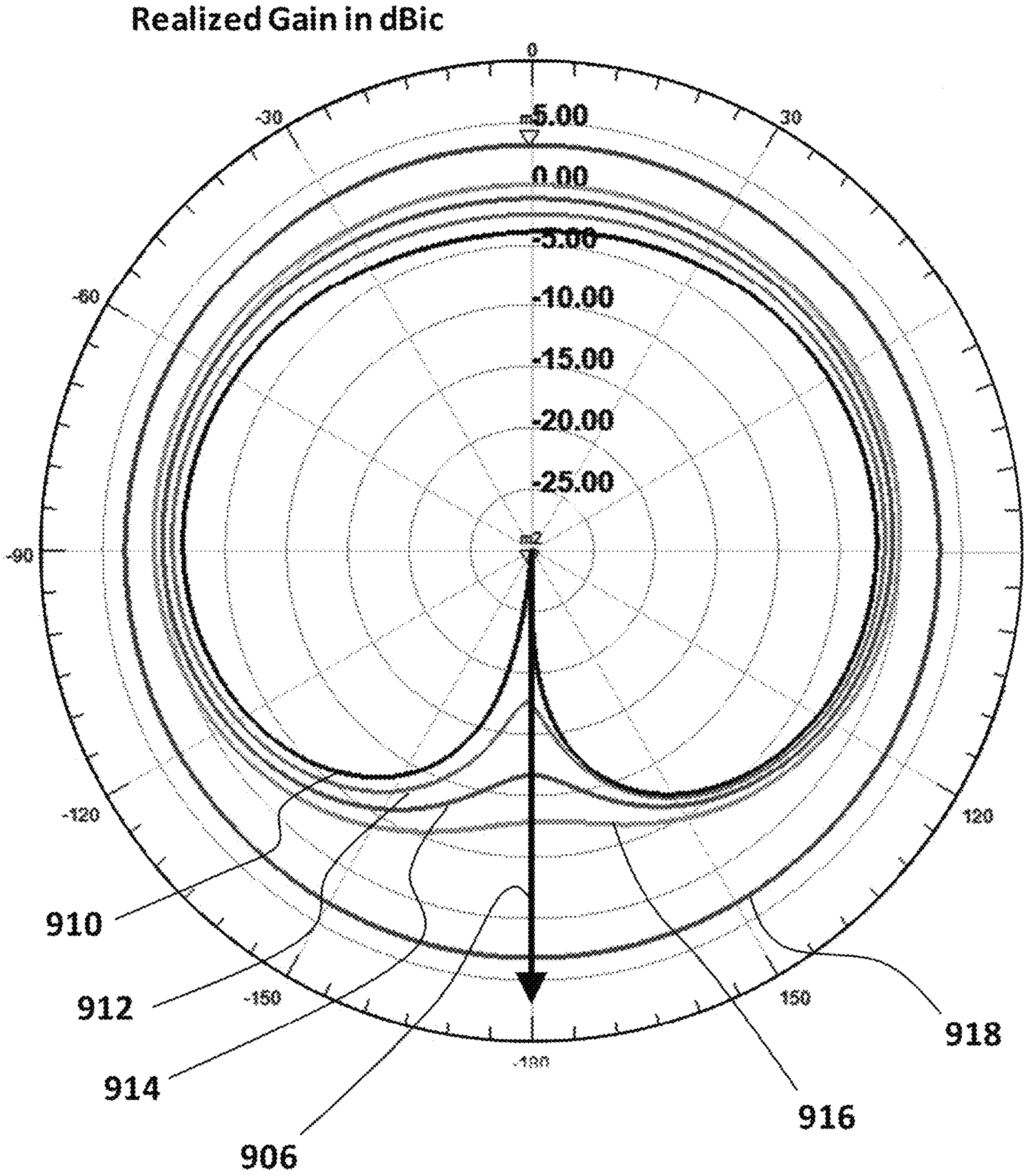
FIG. 9A is the radiation pattern example of FIG. 9 in a different reporting format.

FIG. 9A provides a second example of interference reducing radiation patterns formed by the present invention. Again, the radiation pattern is in IEEE-145 standard radiation pattern coordinates with the single compact antenna 22 located in the XY plane. Units plotted are dBic meaning decibels with respect to isotropic for circular polarization, here right-hand circular polarization. In the FIG. 9A instance a different type of radiation pattern cut is plotted relative the type of FIG. 8. Conical cuts are plotted in FIG. 9A. In all the FIG. 9A conical cut traces, angle Θ is held constant while azimuth angle Φ varies from 0 to 360°. Trace 910 is a conical cut with Θ constant at 55° and Φ varied throughout. Trace 912 is a conical cut with Θ constant at 50° and Φ varied throughout. Trace 914 is a conical cut with Θ constant at 45° and Φ varied throughout. Trace 916 is a conical cut with Θ constant at 40° and Φ varied throughout. Trace 918 is a conical cut with Θ constant at 0° and Φ varied throughout. Trace 918 is straight up the Z axis in the radiation pattern coordinate system. Right hand circular polarization was used as this is the US Global Positioning System standard. The hypothetical jammer is at look angle Θ=55° and Φ=180° as depicted by arrow 906. There, in the null the radiation pattern, gain was −27.8 dBic. Most of the antenna radian sphere, where desired signal sources would located had significantly greater gains. Again the system directs the null towards the jammer rather than the lobe towards the desired signal as nulls have the steepest radiation pattern skirt features. Element weights/coaxial feed excitations used in the FIG. 9A example were as set forth in Table 3:

TABLE 3

| FIG. 9 Example Port Excitations/Element Weights | | |
|---|---|---|
| Port/feed | Amplitude | Phase |
| Second coaxial feed 112 (X axis feed) | +1.0 volts | +0.0 degrees |
| Third coaxial feed 113 (Y axis feed) | +0.117 volts | +189.0 degrees |
| First coaxial feed 108 (Z axis feed) | +1.23 volts | +179.4 degrees |

Figure 9B:
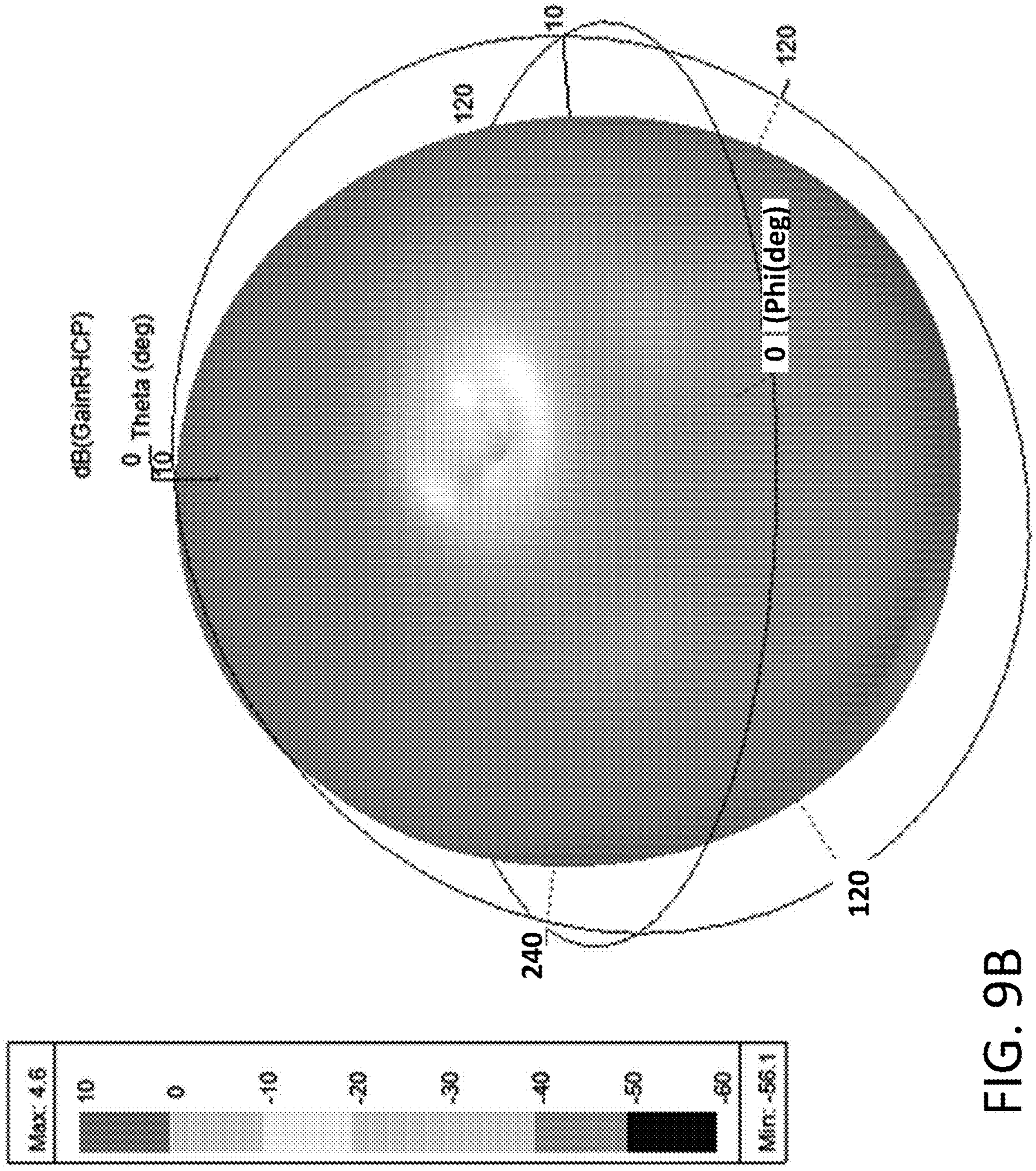
FIG. 9 is an additional radiation pattern example of the antenna device and antijam system in operation against a jamming signal.

These element weights were obtained by the methods described. A far field antenna range was used to measure the FIG. 9A pattern with the jammer and desired signal antennas both at 10 wavelengths distance. Right hand circular polarization dipole turnstiles were used as the jammer and desired signal source antennas. FIG. 9B is the same FIG. 9A radiation pattern example but in a 3D polar format. The present invention is not so limited as to providing nulls only at the FIG. 9A look angle. Single compact antenna 22 is operable with arbitrary polarization and can provide a plurality of nulls.

Figure 10:
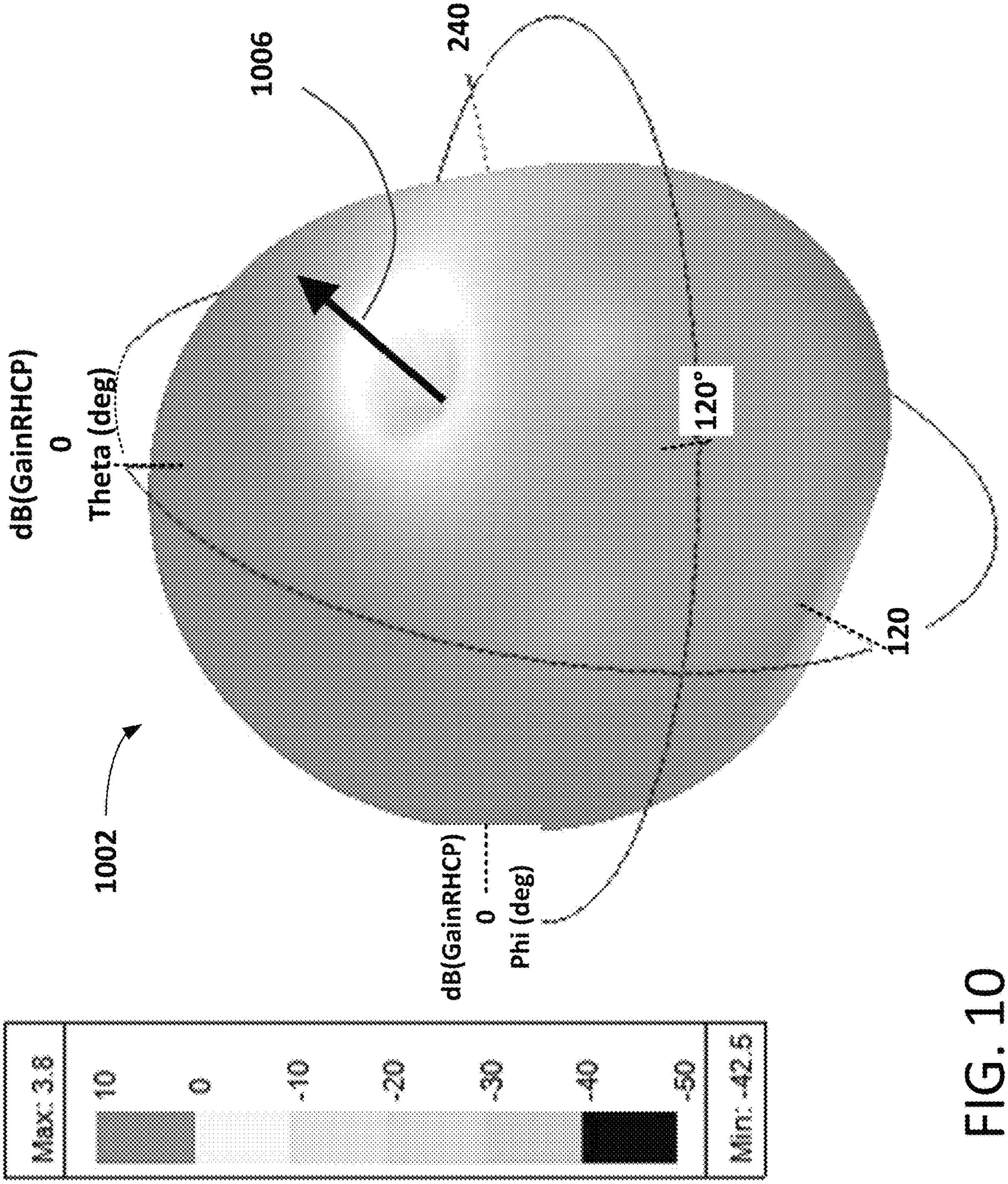
FIG. 10 is an additional radiation pattern example of the antenna device and antijam system in operation against a jamming signal.

FIG. 10 provides a third example of an interference reducing radiation pattern formed by the present invention. Again, the radiation pattern is in IEEE-145 standard radiation pattern coordinates with the XY plane cutting through the single compact antenna 22. Units plotted are dBic meaning decibels with respect to isotropic for circular polarization, here right-hand circular polarization. In FIG. 10, a shaded 3D polar map is depicted. Shaded 3D mapping 1002 is in unites of dBic. Right hand circular polarization was used as this is the US Global Positioning System standard. The hypothetical jammer is at look angle Θ=45° and Φ=146° as depicted by arrow 1006. There, in the null the radiation pattern, gain was −25.0 dBic. Most of the upper half space, where desired signal sources would located had significantly greater gains than −25.0 dBic. In example FIGS. 8, 9, 10 a relatively small ground plane 103 was used so there is significant radiation in the lower half space. This would not be present with a large ground plane 103. Again the system design directs the null towards the jammer rather than the lobe towards the desired signal. This is because nulls have the steeper radiation pattern skirt features than do lobes. Element weights/coaxial feed excitations used in the FIG. 10 example were as set forth in Table 4:

TABLE 4

| FIG. 10 Example Port Excitations/Element Weights | | |
|---|---|---|
| Port/feed | Amplitude | Phase |
| Second coaxial feed 112 (X axis feed) | 1.0 volts | 0.0 degrees |
| Third coaxial feed 113 (Y axis feed) | 3.93 volts | 180.6 degrees |
| First coaxial feed 108 (Z axis feed) | 5.0 volts | 180.5 degrees |

These element weights were obtained by the methods described herein. As in the previous examples, far field antenna range was used to measure the FIG. 10 pattern with the jammer and desired signal antennas at 10 wavelengths distance. Right hand circular polarization dipole turnstiles were used as the jammer and desired signal source antenna.

Figure 11:
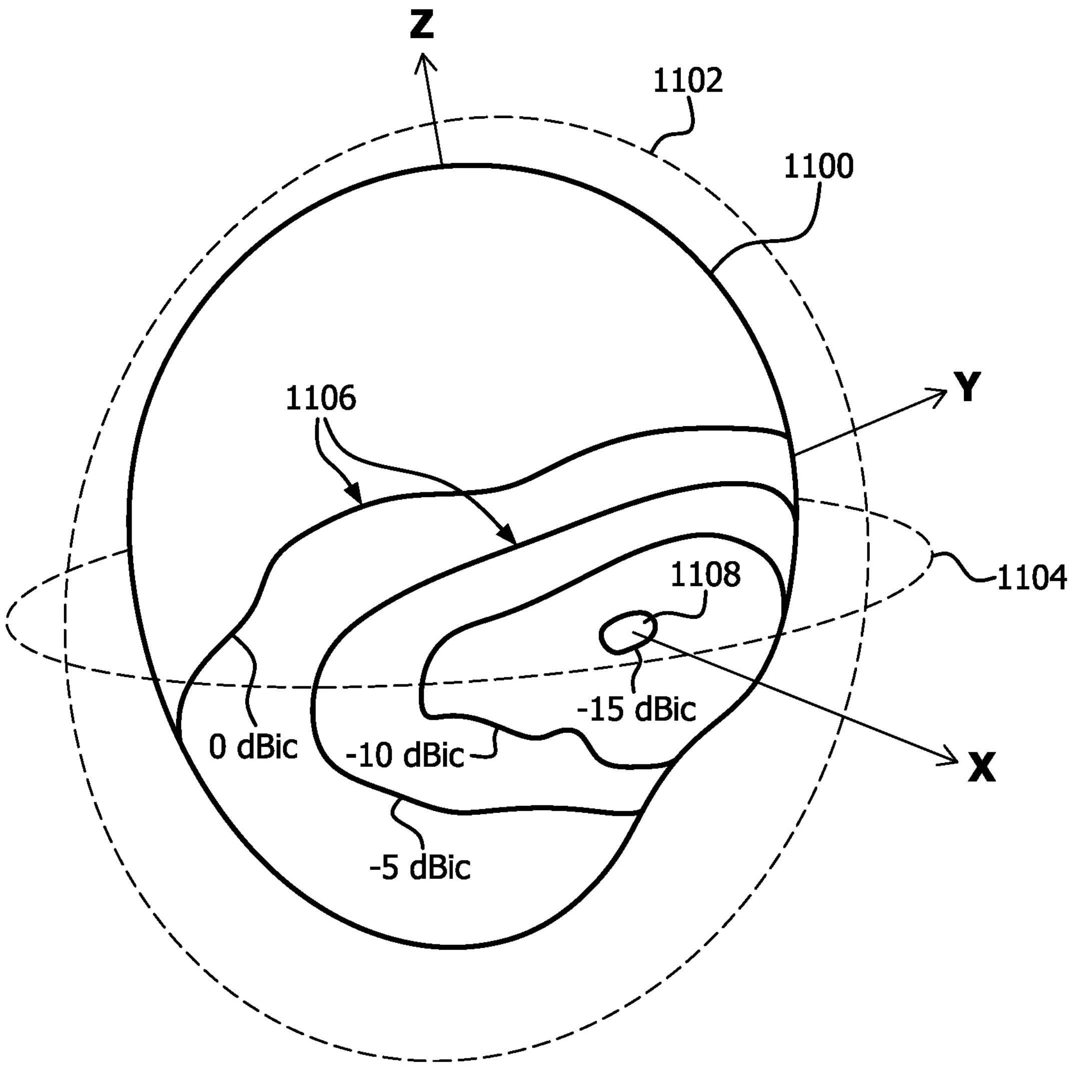
FIG. 11 is a radiation pattern example plot.

FIG. 11 depicts a fourth radiation pattern example plot 1100. Interference reduction at the X axis look angle is the goal in this example. A three dimensional (3D) polar plot format is used in FIG. 11. Dashed line 1102 is a reference line that lies in the YZ plane. Dashed line 1104 is a reference line that lies in the XY plane. Contour lines 1106 map the realized gain at various look angles. Units for the contour lines are decibels with respect to isotropic for circular polarization (dBic). A radiation pattern null 1108 was formed at look angle Θ=90°, Φ=0°. Realized gain on the X axis was −16.0 dBic and the realized gain along the Z axis was +3.8 dBic. As can be seen from FIG. 11 the system 20 usefully provided a radiation pattern null along a cardinal axis. Element weights/coaxial feed excitations used in the FIG. 11 example were as set forth in Table 5:

TABLE 5

| FIG. 11 Example Port Excitations/Element Weights | | |
|---|---|---|
| Port/feed | Amplitude | Phase |
| Second coaxial feed 112 (X axis feed) | 0.62 volts | 4.2 degrees |
| Third coaxial feed 113 (Y axis feed) | 0.22 volts | −90.7 degrees |
| First coaxial feed 108 (Z axis feed) | 0.17 volts | 8.49 degrees |

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for selectively receiving a signal-of-interest, comprising:

using a first planar electrically conductive disc and a second planar electrically conductive disc concentric to and spaced apart from the first planar electrically conductive disc, to define an antenna which produces RF signal outputs at three output ports $E_x$, $E_y$ and $E_z$, each having a different associated gain pattern and polarization response;

automatically asserting at least one null in a pattern defined by the antenna in a specified direction by selectively modifying a gain and a phase of the RF signals respectively produced from the three output ports in accordance with a first set of weighting parameters to obtain a first plurality of weighted RF signals, and then combining the first plurality of weighted RF signals to produce a first receiver signal output.

2. The method of claim 1, wherein the specified direction of the null is automatically calculated based on a determination that a signal source aligned in the specified direction is a jammer or spoofer.

3. The method of claim 2, wherein the determination that the signal source aligned in the specified direction is a jammer is based on a relative magnitude of a received signal level as compared to a noise floor.

4. The method of claim 2, further comprising communicating the first receiver signal output to a primary receiver system which is configured to process precision navigation and timing (PNT) signals.

5. The method of claim 2, further comprising automatically asserting at least one antenna pattern beam defined by the antenna in the specified direction by selectively modifying a gain and a phase of the RF signals output from the three output ports in accordance with a second set of weighting parameters to produce second plurality of weighted RF signals, and then combining the second plurality of weighted RF signals to produce a second receiver signal output.

6. The method of claim 5, wherein the specified direction is automatically calculated based on a preliminary determination that a signal source aligned in the specified direction is a jammer or spoofer.

7. The method of claim 5, further comprising communicating the second receiver signal output to a secondary receiver system which is configured to process PNT signals.

8. The method of claim 7, further comprising adding a noise signal to the second receiver signal output that is communicated to the secondary receiver system to increase a signal-to-noise ratio.

9. The method of claim 7, further comprising classifying the second receiver signal output as a jammer signal if it cannot be demodulated by the secondary receiver system.

10. The method of claim 7, further comprising using the secondary receiver system to determine an identity of a specified satellite which is the purported source of the second receiver signal.

11. The method of claim 10, further comprising using the identity of the specified satellite to determine an expected angle-of-arrival at the antenna of signals from the specified satellite.

12. The method of claim 11, further comprising comparing the expected angle-of-arrival to a measured or estimated angle-of-arrival of received RF signals comprising the second receiver signal.

13. An antijam antispoofing precision timing and navigation (PNT) system, comprising:

an antenna including a first planar electrically conductive disc and a second planar electrically conductive disc concentric to and spaced apart from the first planar electrically conductive disc, the antenna including three output ports $E_x$, $E_y$ and $E_z$ each having a different associated gain pattern and polarization response;

a signal processing system coupled to the antenna configured to assert at least one null in a pattern defined by the antenna in a specified direction by selectively modifying a gain and a phase of RF signals respectively produced from the three output ports in accordance with a first set of weighting parameters to produce a first plurality of weighted RF signals, and combining the first plurality of weighted RF signals to produce a first receiver signal output.

14. The system of claim 13, wherein the signal processing system is configured to automatically calculate the specified direction of the null based on a determination that a signal source aligned in the specified direction is a jammer or spoofer.

15. The system of claim 14, wherein signal processing system is configured to determine that the signal source aligned in the specified direction is a jammer based on a relative magnitude of a received signal level as compared to a noise floor.

16. The system of claim 14, wherein the first receiver signal output is coupled to a primary receiver system which is configured to process precision navigation and timing (PNT) signals.

17. The system of claim 14, wherein the signal processing system is configured to automatically assert at least one antenna pattern beam defined by the antenna in the specified direction by selectively modifying a gain and a phase of the RF signals output from the three output ports in accordance with a second set of weighting parameters to produce second plurality of weighted RF signals, and then combine the second plurality of weighted RF signals to produce a second receiver signal output.

18. The system of claim 17, wherein the signal processing system is configured to automatically calculate the specified direction based on a preliminary determination that a signal source aligned in the specified direction is a jammer or spoofer.

19. The system of claim 17, wherein the second receiver signal output is coupled to a secondary receiver system which is configured to process PNT signals.

20. The system of claim 19, wherein the signal processing system is configured to add a noise signal to the second receiver signal output that is coupled to the secondary receiver system to increase a signal-to-noise ratio.

21. The system of claim 19, wherein the signal processing system is configured to automatically classify the second receiver signal output as a jammer signal if the second receiver signal output cannot be demodulated by the secondary receiver system.

22. The system of claim 19, wherein the signal processing system is configured to use the secondary receiver system to determine an identity of a specified satellite which is the purported source of the second receiver signal.

23. The system of claim 22, wherein the signal processing system is configured to use the identity of the specified satellite to determine an expected angle-of-arrival at the antenna of signals from the specified satellite.

24. The system of claim 23, wherein the signal processing system is configured to compare the expected angle-of-arrival to a measured or estimated angle-of-arrival of received RF signals comprising the second receiver signal.

* * * * *